(12) United States Patent
Harne

(10) Patent No.: US 12,158,190 B2
(45) Date of Patent: *Dec. 3, 2024

(54) DESIGNS AND MANUFACTURING METHODS FOR LIGHTWEIGHT HYPERDAMPING MATERIALS PROVIDING LARGE ATTENUATION OF BROADBAND-FREQUENCY STRUCTURE-BORNE SOUND

(71) Applicant: Ohio State Innovation Foundation, Columbus, OH (US)

(72) Inventor: Ryan L. Harne, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/087,869

(22) Filed: Dec. 23, 2022

(65) Prior Publication Data

US 2023/0383807 A1   Nov. 30, 2023

Related U.S. Application Data

(63) Continuation of application No. 16/587,189, filed on Sep. 30, 2019, now Pat. No. 11,536,343, which is a continuation of application No. 15/447,934, filed on Mar. 2, 2017, now Pat. No. 10,458,501.

(60) Provisional application No. 62/302,405, filed on Mar. 2, 2016.

(51) Int. Cl.
   *F16F 1/36*   (2006.01)

(52) U.S. Cl.
   CPC ................... *F16F 1/3605* (2013.01)

(58) Field of Classification Search
   CPC ..................................... F16F 1/3605
   See application file for complete search history.

(56) References Cited

U.S. PATENT DOCUMENTS

| | | | |
|---|---|---|---|
| 5,400,296 A | 3/1995 | Cushman et al. | |
| 7,837,008 B1 | 11/2010 | Lane et al. | |
| 8,172,036 B2 | 5/2012 | Tanielian | |
| 8,857,564 B2 | 10/2014 | Ma et al. | |
| 9,466,283 B2 | 10/2016 | Yang et al. | |
| 9,520,121 B2 | 12/2016 | Sheng et al. | |
| 9,659,557 B2 | 5/2017 | Yang et al. | |
| 10,458,501 B2 | 10/2019 | Harne | |
| 11,536,343 B2* | 12/2022 | Harne | F16F 7/108 |
| 2016/0027427 A1 | 1/2016 | Yang et al. | |
| 2017/0268591 A1 | 9/2017 | Harne | |
| 2019/0035374 A1 | 1/2019 | Martin | |

OTHER PUBLICATIONS

Acar and C. Yilmaz, Experimental and numerical evidence for the existence of wide and deep phononic gaps induced by inertial amplification in two-dimensional solid structures. Journal of Sound and Vibration 332 (2013) 6389-6404.

(Continued)

*Primary Examiner* — Forrest M Phillips
(74) *Attorney, Agent, or Firm* — Meunier Carlin & Curfman LLC

(57) ABSTRACT

A hyperdamping inclusion under constraint with large, broadband frequency damping properties is disclosed. The inclusion includes materials under near-buckling constraint such that fundamental eigenfrequency vanishes at near-buckling.

21 Claims, 17 Drawing Sheets

(56) References Cited

OTHER PUBLICATIONS

Antoniadis, D. Chronopoulos, V. Spitas, and D. Koulocheris, Hyper-damping peroperties of a stiff and stable linear oscillator with a negative stiffness element. Journal of Sound and Vibration 346 (2015) 37-52.

Baravelli and M. Ruzzene, Internally resonating lattices for bandgap generation and low-frequency vibration control. Journal of Sound and Vibration 332 (2013) 6562-6579.

Dong and R.S. Lakes, Advanced damper with negative structural stiffness elements. Smart Materials and Structures 21 (2012) 075026.

Florijn, C. Coulais, and M. van Hecke, Programmable mechanical metamaterials. Physical Review Letters 113 (2014) 175503.

Groby, C. Lagarrigue, B. Brouard, O. Dazel, and V. Tournat, Using simple shape three-dimensional rigid inclusions to enhance porous layer absorption. The Journal of the Acoustical Society of America 136 (2014) 1139-1148.

Harne, On the linear elastic, isotropic modeling of poroelastic distributed vibration absorbers at low frequencies. Journal of Sound and Vibration 332 (2013) 3646-3654.

Hu and R. Burgueño, Buckling-induced smart applications: recent advances and trends. Smart Materials and Structures 24 (2015) 063001.

Hussein and M.J. Frazier, Metadamping: an emergent phenomenon in dissipative metamaterials. Journal of Sound and Vibration 332 (2013) 4767-4774.

Hussein, M.J. Leamy, and M. Ruzzene, Dynamics of phononic materials and structures: historical origins, recent progress, and future outlook. Applied Mechanics Reviews 66 (2014) 040802.

Idrisi, M.E. Johnson, A. Toso, and J.P. Carneal, Increase in transmission loss of a double panel system by addition of mass inclusions to a poro-elastic layer: a comparison between theory and experiment. Journal of Sound and Vibration 323 (2009) 51-66.

Idrisi, M.E. Johnson, D. Theurich, and J.P. Carneal, A study on the characteristic behavior of mass inclusions added to a poro-elastic layer. Journal of Sound and Vibration 329 (2010) 4136-4148.

Johnson, R.L. Harne, and K.W. Wang, A disturbance cancellation perspective on vibration control using a bistable snap-through attachment. Journal of Vibration and Acoustics 136 (2014) 031006.

Kidambi, R.L. Harne, and K.W. Wang, Adaptation of energy dissipation in a mechanical metastable module excited near resonance. Journal of Vibration and Acoustics 138 (2016) 011001.

Krödel, N. Thomé, and C. Daraio, Wide band-gap seismic metastructures. Extreme Mechanics Letters 4 (2015) 111-117.

Krödel, T. Delpero, A. Bergamini, P. Ermanni, and D.M. Kochmann, 3D auxetic microlattices with independently controllable acoustic band gaps and quasi-static elastic moduli. Advanced Engineering Materials 16 (2014) 357-363.

Lagarrigue, J.P. Groby, V. Tournat, O. Dazel, and O. Umnova, Absorption of sound by porous layers with embedded periodic arrays of resonant inclusions. The Journal of the Acoustical Society of America 134 (2013) 4670-4680.

Liu, G.K. Hu, G.L. Huang, and C.T. Sun, An elastic metamaterial with simultaneously negative mass density and bulk modulus. Applied Physics Letters 98 (2011) 251907.

Ma, M. Yang, S. Xiao, Z. Yang, and P. Sheng, Acoustic metasurface with hybrid resonances. Nature Materials 13 (2014) 873-878.

Nouh, O. Aldraihem, and A. Baz, Wave propagation in metamaterial plates with periodic local resonances. Journal of Sound and Vibration 341 (2015) 53-73.

Restrepo, N.D. Mankame, and P.D. Zavattieri, Phase transforming cellular materials. Extreme Mechanics Letters 4 (2015) 52-60.

Sain, J. Meaud, G. Hulbert, E.M. Arruda, and A.M. Waas, Simultaneously high stiffness and damping in a class of wavy composites. Composite Structures 101 (2013) 104-110.

Shan, S.H. Kang, J.R. Raney, P. Wang, L. Fang, F. Candido, J.A. Lewis, and K. Bertoldi, Multistable architected materials for trapping elastic strain energy. Advanced Materials 27 (2015) 4296-4301.

Shan, S.H. Kang, P. Wang, C. Qu, S. Shian, E.R. Chen, and K. Bertoldi, Harnessing multiple folding mechanisms in soft periodic structures for tunable control of elastic waves. Advanced Functional Materials 24 (2014) 4935-4942.

Ungar, The status of engineering knowledge concerning the damping of built-up structures. Journal of Sound and Vibration 26 (1973) 141-154.

Virgin and R. Wiebe, On damping in the vicinity of critical points. Philosophical Transactions of the Royal Society A 371 (2013) 20120426.

Wang, F. Casadei, S. Shan, J.C. Weaver, and K. Bertoldi, Harnessing buckling to design tunable locally resonant acoustic metamaterials. Physical Review Letters 113 (2014) 014301.

Wang, M. Ludwigson, and R.S. Lakes, Deformation of extreme viscoelastic metals and composites. Materials Science and Engineering A 370 (2004) 41-49.

Wojnar, J.B. le Graverend, and D.M. Kochmann, Broadband control of the viscoelasticity of ferroelectrics via domain switching. Applied Physics Letters 105 (2014) 162912.

Wu, R.L. Harne, and K.W. Wang, Energy harvester synthesis via coupled linear-bistable system with multistable dynamics. Journal of Applied Mechanics 81 (2014) 061005.

Slagle and C.R. Fuller, Low frequency noise reduction using poro-elastic acoustic metamaterials, in Proceedings of the 21st AIAA/CEAS Aeroacoustics Conference, Dallas, Texas, USA, 2015, pp. AIAA 2015-3113.

ASTM International, "Standard Test Method for Impedance and Absorption of Acoustical Materials Using a Tube, Two Microphones and a Digital Frequency Analysis System," ASTM E1050-12, (2012).

* cited by examiner (a)

(b)

DESIGNS AND MANUFACTURING METHODS FOR LIGHTWEIGHT HYPERDAMPING MATERIALS PROVIDING LARGE ATTENUATION OF BROADBAND-FREQUENCY STRUCTURE-BORNE SOUND

CROSS REFERENCE TO RELATED APPLICATIONS

This application is a continuation of U.S. patent application Ser. No. 16/587,189, filed Sep. 30, 2019, which is a continuation application of U.S. patent application Ser. No. 15/447,934, filed Mar. 2, 2017, now U.S. Pat. No. 10,458,501, issued Oct. 29, 2019, and claims priority to U.S. Provisional Patent Application No. 62/302,405, filed Mar. 2, 2016, which applications are hereby incorporated by reference in their entirety for all purposes as if fully set forth herein.

BACKGROUND OF THE INVENTION

Field of the Invention

Embodiments of the present invention relate to damping materials having reduced weight than alternative material selections, and more specifically hyperdamping materials and inclusions for application in a variety of structures.

Background

The absorption or attenuation of spectrally broadband vibration and wave energy are goals that have called upon the efforts of researchers spanning diverse engineering and scientific disciplines over the years. While resonant phenomena can facilitate striking vibroacoustic energy trapping, many scenarios involve wide-band or stochastic energy sources for which broadband energy capture is necessary. Typically, the only assured solution for broadband energy attenuation is to introduce excessive mass between the dynamic energy source and the region/receiver of interest, which conflicts with requirements for many applications, such as vehicular systems, where added mass is detrimental to performance and effectiveness. In addition, while input energies may cause vibrations at low frequencies associated with modal oscillations, practical structures transfer the energy to higher frequencies due to joints, friction, and complex geometries, thus creating a 'noise problem' in a bandwidth most sensitive to humans through inevitable structure-fluid interaction. Although conventional noise control treatments such as lightweight, poroelastic media are well-suited to dampen waves in this mid-to-high frequency range, they are ill-suited to attenuate low frequency vibrations and sound within typical size constraints. As a result, there is a need for lightweight materials to dampen spectrally broadband vibroacoustic energies.

To address the challenges, strategically architected material systems have been explored that provide elastic and acoustic wave attenuation capabilities not otherwise found in bulk structural materials. Among them, resonant metamaterials and phononic crystals exhibit opportunities to suppress vibration and wave energies due to tuned-mass-damper or bandgap effects. However, despite the advancements, the energy attenuation properties are reliant upon resonance- or bandgap-related phenomena that are often parameter sensitive and narrowband. In addition, many experimental realizations have been proposed using heavy materials including metals and dense rubbers, which are inadequate solutions in the numerous practical applications where treatment weight is a great penalty.

Building upon these ideas, periodic, elastic metamaterials leveraging instability mechanisms are shown to yield remarkable wave propagation control and energy absorption capabilities due to energy changes associated with transitions among internal topologies. On the other hand, these elastic systems are likewise realized by dense materials such as silicones or 3D-printed polymers that are ill-suited for applications where increased treatment density comes at a high cost due to the weight they add to finished products. Static stresses or exterior displacement constraints may also be needed to achieve the wave tailoring properties through the buckling instability, which prevents implementing such metamaterials as absorbers of free field acoustic energy, in the operational mode similar to conventional poroelastic foams. In fact, it is well-known that buckling instability-based phenomena can enhance energy dissipation properties. Such anomalous damping is due to a cancellation of the positive and negative stiffnesses, a design condition termed the elastic stability limit, which eliminates the fundamental natural frequency $\omega_n \to 0$.

Yet, despite the recent advancements the reliance upon parameter-sensitive resonance-related phenomena, the use of dense materials, and possible need for exterior material constraints, make these concepts insufficient solutions for applications demanding lightweight materials for broadband vibration and acoustic energy capture.

With a different material design perspective in mind, other recent studies show that heterogeneous, poroelastic metamaterials can achieve considerable wave and/or vibration energy absorption. For instance, randomly embedding solid, metal inclusions into poroelastic foams improves the low frequency attenuation of the host media. Periodically distributing such inclusions also spawns bandgap phenomena to substantially increase low frequency vibroacoustic energy absorption via "trapped" mode effects. On the other hand, such advancements lack broadband vibroacoustic energy dissipation in a lightweight system design; instead, these poroelastic metamaterials excel at one or another of the individual performance measures.

BRIEF SUMMARY OF THE INVENTION

Accordingly, the present invention is directed to designs and manufacturing methods for lightweight hyperdamping materials providing large attenuation of broadband-frequency structure-borne sound that obviates one or more of the problems due to limitations and disadvantages of the related art.

An advantage of the present invention is to provide a wave attenuation device, comprising an elastic metamaterial with at least two voids in the elastic metamaterial where the elastic metamaterial under a geometric or stress constraint such that the elastic material is near a buckling condition In another aspect of the present invention and further embodiment of the hyperdamping materials, a wave-attenuated structure, includes at least one load-imparting wall; a wave attenuation device, comprising an elastic metamaterial having at least two voids in the elastic metamaterial, the elastic metamaterial under a geometric or stress constraint such that the elastic material is near a buckling condition; wherein the constraint is provided by the at least one load-imparting wall.

In another aspect of the present invention and further embodiment of the hyperdamping materials, a wave attenuation device includes a hollow metal shell having a cross-sectional shape having a first dimension; and elastomeric material within the metal shell and having a cross-sectional shape mimicking the first cross-sectional shape, the elastomeric material having a second dimension, the second dimension greater than the first dimension in a fully expanded state and a third dimension less than the first dimension in a compressed state within the metal shell.

Further embodiments, features, and advantages of the hyperdamping materials, as well as the structure and operation of the various embodiments of the hyperdamping materials and devices, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate lightweight hyperdamping materials according to principles of the present invention. Together with the description, the figures further serve to explain the principles of the lightweight hyperdamping materials described herein and thereby enable a person skilled in the pertinent art to make and use the hyperdamping materials.

DETAILED DESCRIPTION OF THE INVENTION

Figure 1A:
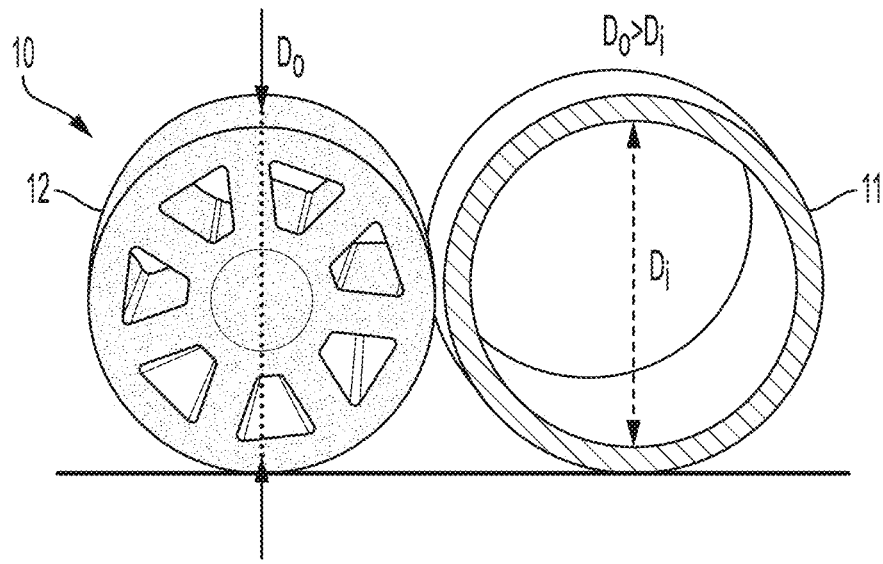
FIG. 1a illustrates a side view of a hyperdamping inclusion according to principles of the present invention in disassembled form.

Reference will now be made in detail to embodiments of the hyperdamping materials with reference to the accompanying figures, in which like reference numerals indicate like elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

According to principles of the present invention, a new class of engineered material system provides large, broadband-frequency energy damping properties—hyperdamping. Furthermore, the "engineering" of the material system according to principles of the present invention removes mass from the baseline, non-engineered material, such that these new hyperdamping materials are also lighter in weight than conventional materials. These advantages—lightweight, and high damping across broad frequency bandwidth—are desirable in numerous applications, including vehicular, architectural, and infrastructural applications where such performance measures are typically at-odds. The important consequence of the elastic stability limit for hyperdamping systems according to principles of the present invention is that the damping ratio grows without bound according to the classic relation for the fundamental modal damping ratio $\zeta = c/2\, m\omega_n$ where c and m are the modal damping constant and mass, respectively. Exemplary embodiments of design and fabrication procedures of hyperdamping materials according to principles of the present invention are provided herein. In addition, experimental measurements to demonstrate the performance of the various embodiments are provided, although are not meant to be limited to the scope of the invention.

Figure 1B:
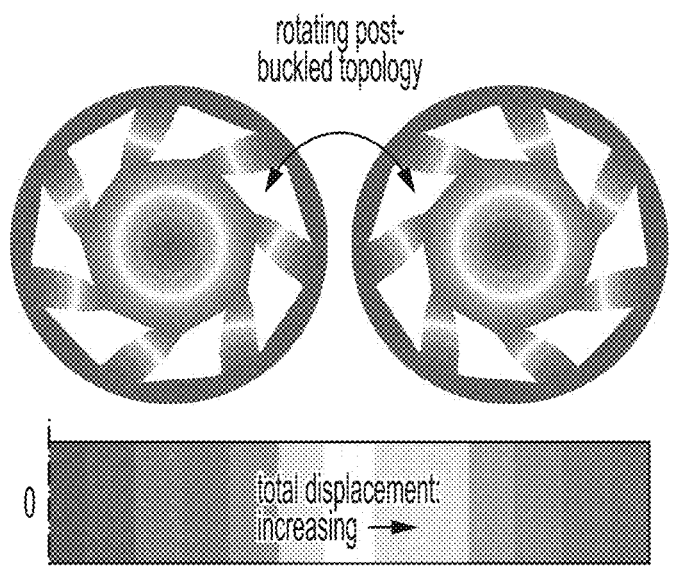
FIG. 1b shows finite element model results that predict rotational motions for pre- and post-buckled designs.

An exemplary embodiment of "hyperdamping inclusion" 10 is illustrated in FIG. 1. FIG. 1 (a) shows a hyperdamping inclusion 10 design according to principles of the present invention such that the elastomer element 12 outer diameter $D_o$ is greater than the inner diameter $D_i$ of the rigid, metal shell 11. FIG. 1(b) shows finite element model results that predict rotational motions for pre- and post-buckled designs. FIG. 2 illustrates that a whole inclusion rotation is exhibited for increasing degree of pre-compression upon inserting the elastomer/mass 12 into the metal shell 11, such that the inner elastic 14 or metallic center masses 16 rotate. FIG. 3 illustrates a hyperdamping metamaterial 24 with embedded inclusions 20 in poroelastic media 24 to attenuate and absorb incident acoustic waves 26 and structural vibrations 28.

According to principles of the present invention, beam-like sub-components 18 are constrained in a way that causes them to nearly buckle. For example, the elastomer inclusions 10 illustrated in FIGS. 1, 2A and 2B include the radially arrayed beams 18 that are constrained geometrically by virtue of the outer shell 11 and inner lumped mass 14. For instance, the lumped mass 14 in FIG. 1 (a) is the central cylinder of elastomer out of which the radially-arrayed beams 18 extend. Such near-buckling can be realized in any material system that can be "architected" with beam-like internal geometries. This includes laser cutting into metal, wood, and so on such geometric features and have those material components serve under constraint or static pre-load (that gives similar effect as constraint).

As illustrated, the exemplary device includes an elastomer inclusion. The elastomer inclusions are in a pattern with radially-arrayed beams extending from a central, lumped elastomer mass. Namely, a soft, cylindrical and sculpted elastomer element is inserted into a metal shell 11 that has an inner diameter $D_i$ smaller than the element's outer diameter $D_o$, as illustrated in FIG. 1a. This configuration is intended to load the elastomer topology at the elastic stability limit. FIG. 1b shows finite element modeling results to illustrate stable, post-buckled topologies of the elastomer element if the constraint induces a stress beyond criticality.

The elastomer/mass may be inserted into a shell that extends the same length of the elastomer inclusion. This shell geometrically constrains the elastomer structure. For example, the outer elastomer diameter is greater than the inner diameter of the shell. $D_o/D_i > 1$. This chosen diameter ratio results in the radially-arrayed beams 18 of the inclusion 10 nearly buckling under the geometric constraint. This strategic constraint underlies the high damping, because beams 18 compressed at this so-called "elastic stability limit" possess an infinitely large damping ratio due to the elimination of the fundamental elastic stiffnesses. The uses of hyperdamping inclusions 10 according to principles of the present invention are many-fold. For example, as illustrated in FIG. 3, the inclusions 20 may be embedded into a soft, poroelastic foam 24 where they attenuate structure-borne sound by the local, yet unusually greatly damped, resonances they undergo in consequence to the effective stiffness and damping of the host foam material. Such applications would include acoustic barriers or panels in residential or vehicular applications. According to principles of the present invention, it is also possible that the constraint condition is imposed by surrounding structure in lieu of the disclosed metal shell. That is, external stress can provide the near-buckling condition that underlies the damping properties of the beam-like structure of the elastomer element structure.

Depending on the design of internal elastomer elements, such as with or without a solid metal cylinder 16, buckling may or may not occur for given sizes of the metal shell 11, such as those illustrated in FIG. 2. Such factors establish a versatile means for hyperdamping inclusion 10 design and tuning.

Figure 2A:
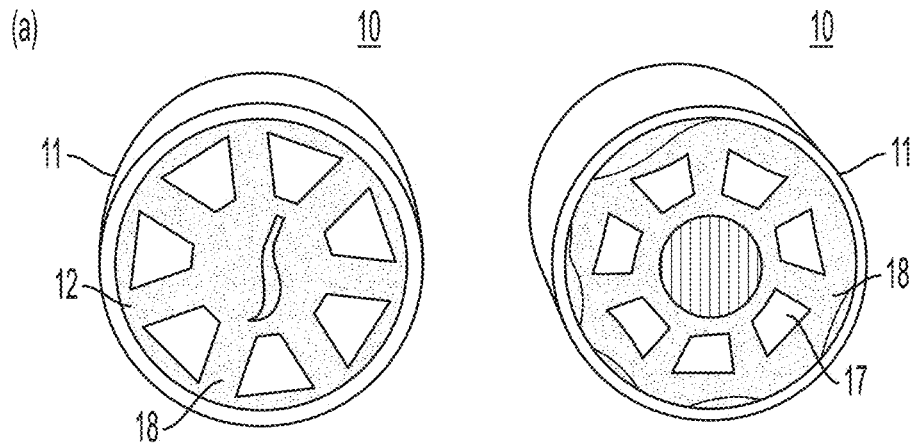
FIG. 2A illustrates a side view of a hyperdamping inclusion according to principles of the present invention.
Figure 2A:
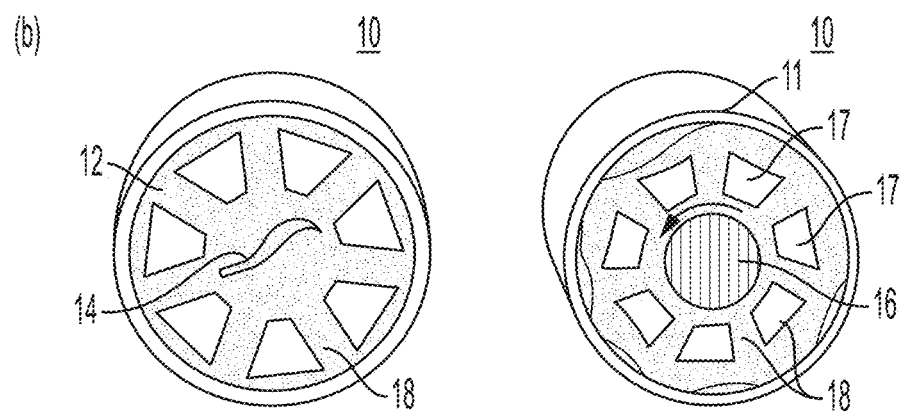
Figure 2A:
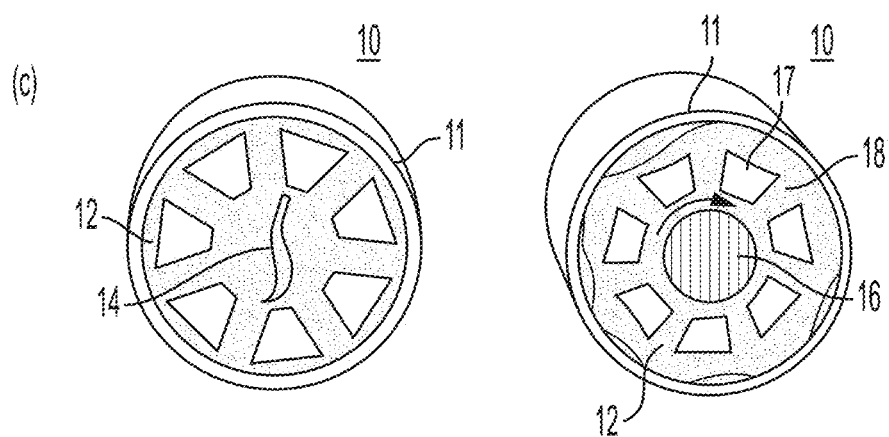
Figure 2B:
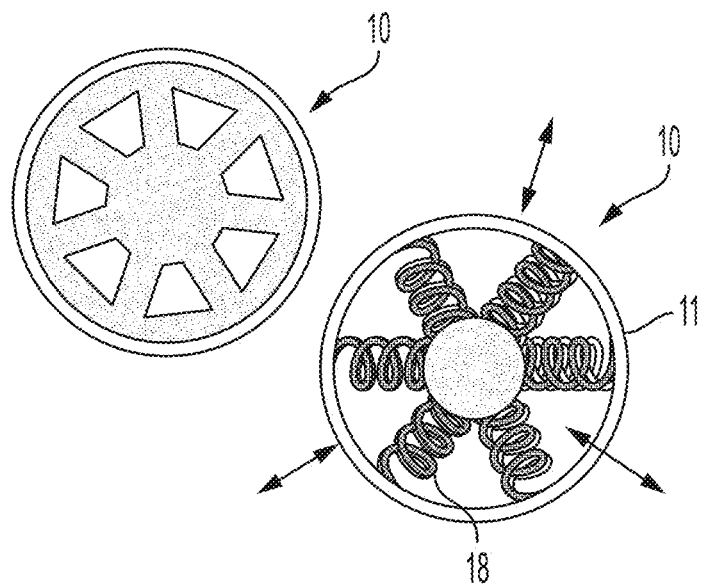
FIG. 2B illustrates spring forces associated with the illustrated hyperdamping inclusion.
Figure 3:
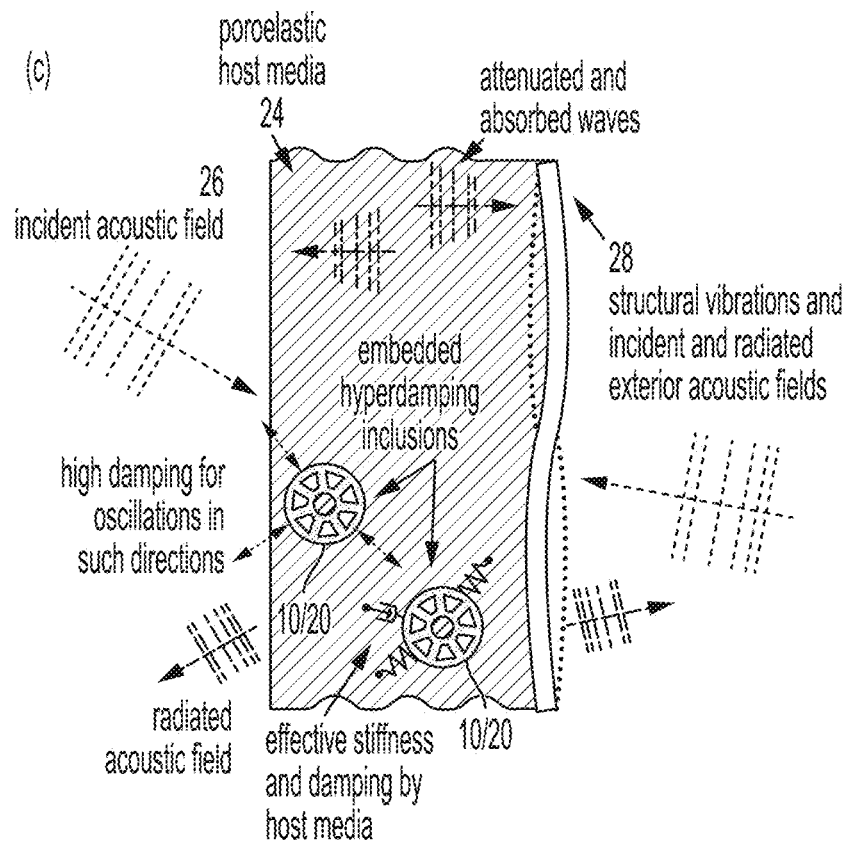
FIG. 3 illustrates hyperdamping inclusions according to principles of the present invention embedded in a poroelastic material.

Developed in this way and considering the shell 11 to be fixed, the hyperdamping inclusion is an extremely damped spring-mass, as illustrated schematically by FIG. 2B, having a vanishingly small natural frequency, where mass contributions are from the internal elastomer 14 and other internal constituents, such as the metal cylinder shown in FIGS. 2A and 3, in which the illustrated "springs" refer to the critically-loaded, radially-arrayed beams 18 of the inclusion 10/20. The inherent damping constant of this equivalent oscillator is that associated with the elastomer, and the relative impact of the finite damping grows upon loading the inclusion at the elastic stability limit. To leverage the inclusion for wave energy capture, a hyperdamping inclusion 20 according to principles of the present invention may be embedded into poroelastic foam 24 where the total inclusion mass (i.e. the shell 11 and what is within) generates an additional mass-spring-damper degree-of-freedom (DOF) due to the host media 24, as illustrated in FIG. 3. Two resulting natural frequencies of this equivalent two DOF system occur at a vanishingly-small value due to the critically buckled constituent and at a (typically low) frequency associated with the total inclusion mass and host media properties. Thus, from an observer's perspective, the lightweight inclusion according to principles of the present invention responds dynamically like an extremely damped single DOF that yields massive vibroacoustic energy damping in a broad frequency bandwidth around and above the low natural frequency associated with the total inclusion resonance. Thus, by leveraging a critically-loaded "hidden" DOF, the hyperdamping metamaterial exhibits beneficial levels of vibration and wave energy attenuation and absorption using a lightweight design that interfaces with the acoustic free field and does not rely on purely resonant phenomena to provide its effects. Here, the term "metamaterial" refers to an engineered material system that exhibits non-natural properties by virtue of "hidden" internal constituents.

There is no limitation on the use of this concept with elastomeric materials. The inclusions may be formed of any suitable elastomer, including, but not limited to, natural rubber, synthetic rubber, butyl rubber, silicone rubber, butadiene rubber, neoprene, fluoroelastomer, thermoplastics, elastin, resilin, polysulfide, thermoset, polyurethane, or the like. The elastomeric material making up the inclusion according to principles of the present invention are not limited to this list. The pattern may be formed by sculpting, injection molding, extrusion, 3-D printing, or the like. For example, the elastomer inclusion may be made by providing the elastomer in a mold that is created in the negative of the desired inclusion shape. Thus, once the elastomer cures in the mold, the removed component possesses the design features of interest. A, central mass 14 or 16 may also be provided in the elastomer inclusion 10, as shown in FIG. 2. The central mass may include metal, ceramic, plastic, or other material providing suitable mass in the inclusion.

An exemplary process for fabricating hyperdamping materials according to principles of the present invention is described herein. The fabrication of the hyperdamping metamaterials is undertaken in several steps. For example, a 3D printer (such as, but not limited to, FlashForge Creator Pro) generates acrylonitrile butadiene styrene (ABS) molds that are the negative of the desired elastomer elements. Silicone (such as, but not limited to, Smooth-On, Inc., Mold Star 15S) is poured into the molds that may be previously sprayed with a release agent (such as, but not limited to, Smooth-On, Inc., Ease Release 200). The samples are removed after the recommended curing time for the material used has elapsed. In the exemplary embodiment, elastomer samples are cut to 19 mm length and allowed to set at room temperature for a sufficient time prior to further use. If the elastomer samples include interior metal cylinders (e.g., 6.35 mm outer diameter and 19 mm length) such as the samples shown at right in FIG. 2, the cylinders are held in place in the mold so that the silicone cures around the cylinder.

In prepared samples according to principles of the present invention, several samples of a given outer elastomer diameter $D_o$ were produced (ranging from $D_o \in [16.38, 18.16]$ mm), whether with solid elastic interior masses or with interior metal cylinders. The elastomer elements produced by this method exhibited a mean standard deviation of outer diameter of 69 μm, which is on the order of the reported resolution of the 3D printer. The mean mass of the inclusions with elastomer and metallic internal masses are 3.42 g and 8.04 g, respectively. Aluminum shells of inner diameter $D_i = 16.56$ mm and thickness 1.25 mm are cut to 19 mm lengths and the elastomer elements are carefully inserted into the shells. Sample inclusions 10 made according to this exemplary process include seven rotationally-symmetric voids 17, as shown in FIG. 1. Inclusions made according to principles of the present invention can include any number of voids 17. Performance of inclusions with at least two voids to realize an annular region around the interior mass such that the mass is capable of buckling under the displacement constraint imposed by the metal shell or other structure, are described herein.

A finite element (FE) model is useful to develop insight on inclusion topological designs that maximize the effective damping properties of the components once embedded into the poroelastic media. An exemplary finite element model may be composed using the commercial software package, such as COMSOL Multiphysics. The elastomer element designs of interest are those that are loaded around at the elastic stability limit once constrained within the metal shells, such that the softening influences are most prominent. In other words, the elastomer elements are intended to be extremely close to the point of buckling to maximize the effective damping properties when the inclusion (shell and elastomer element) is embedded into the poroelastic foam. As previously shown, the resonance of the embedded inclusion in the foam is influenced by factors that consider such inclusions as equivalent lumped masses within a distributed elastic media. The rotational symmetry of the molded elastomer designs considered here is based on the finding that applied stress on an instability-driven periodic metamaterial induces a symmetry breaking at the critical buckling stress, as illustrated by FIG. 1b. Although several design parameters may be tailored to sculpt the topology in ways that provide means to critically stress the elastomer elements, the focus in this example is on changing the diametric ratio $D_o/D_i$ and the ratio of rotation angles $\alpha/\beta$ in an elastomer element having seven voids, top of FIG. 4. The rotational angle ratios $\alpha/\beta$ considered are set by the limits of fabrication using the current or available practice, while the diametric ratios $D_o/D_i$ must be >1 to induce buckling.

Figure 4:
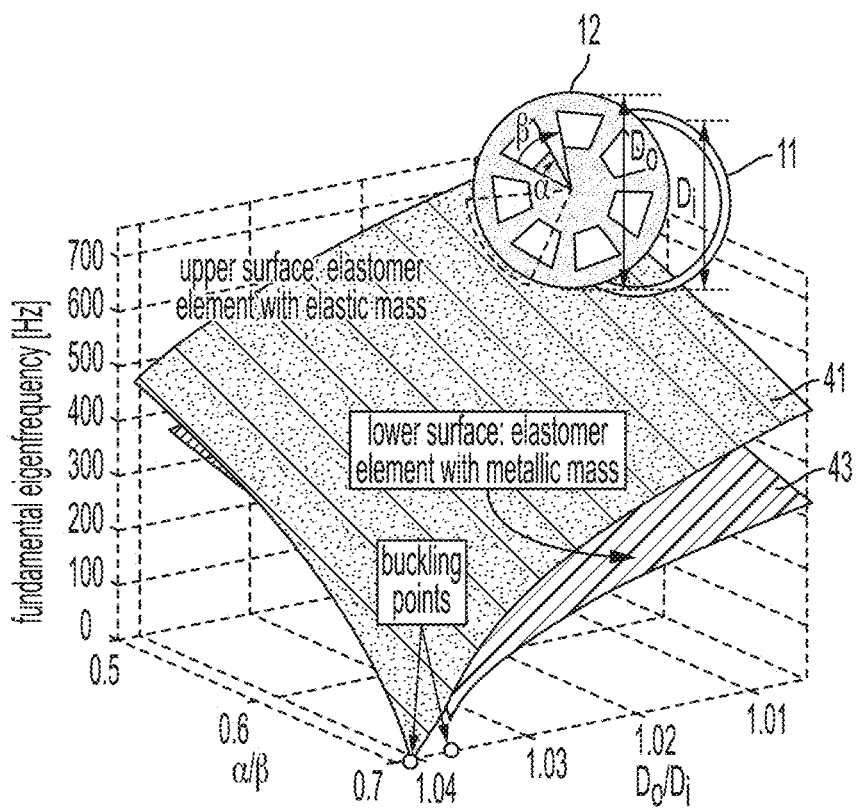
FIG. 4 is a finite element analysis plot for a hyperdamping inclusion according to principles of the present invention.

Referring to FIG. 4, an illustration at the top right shows the design parameters of the diametric ratio $D_o/D_i$ and the rotational angle ratio $\alpha/\beta$. The surfaces show the influence on the fundamental eigenfrequency of the elastomer element by tailoring these parameters. The upper surface considers the elastomer element with the same internal elastomer mass, while the lower surface considers the metallic mass in the elastomer element.

Figure 5A:
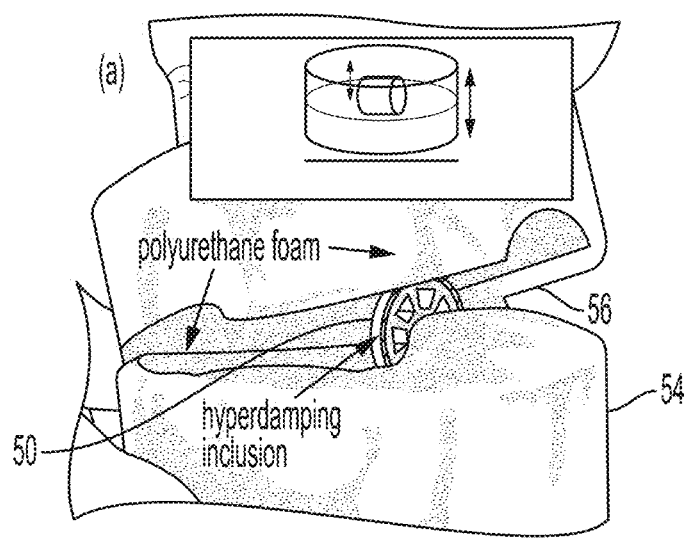
FIGS. 5A and 5B show a hyperdamping metamaterial specimen according to principles of the present invention prior to assembly.
Figure 5B:
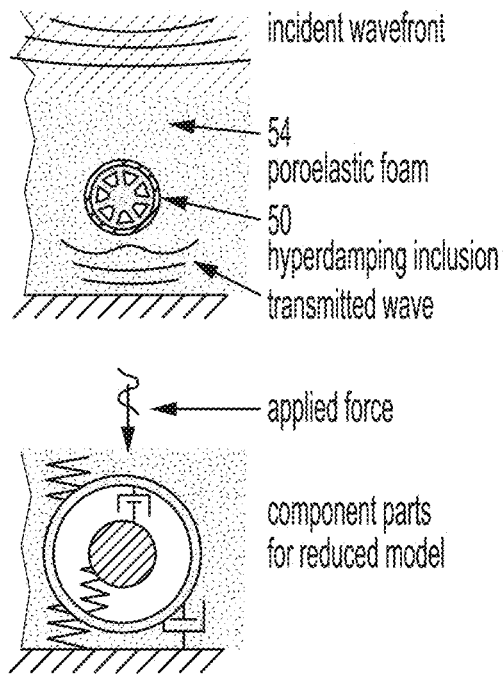

As observed in the finite element model results in FIG. 4, the decrease of the absolute value of the lowest eigenfrequency, which vanishes at the buckling point, may span orders of magnitude via tailoring the diametric and rotational angle ratios. FIG. 4 presents results for cases in which the interior mass of the elastomer element is also elastomer material (upper surface 41) or the elastomer element contains the metallic interior mass (lower surface 43), which are the compositions exhibited in FIG. 2. It is observed that for a given selection of rotational angle and diametric ratios, the inclusion with elastomer inner mass possesses the higher fundamental eigenfrequency. By strategically tailoring these ratios, the eigenfrequency can be adjusted from values in the 100s of Hz to the buckling point (0 Hz), which stresses the elastomer element at the elastic stability limit. The shape of this fundamental mode, as well as the first buckling mode, is exemplified in the finite element model results in FIG. 1b. From the model predictions presented in FIG. 4, rotational angle ratios at the limits of the current or available fabrication capabilities ($\alpha/\beta \approx 0.7$) are required to buckle the elastomer elements within a reasonable amount of geometric constraint $D_o/D_i < 1.05$. As observed empirically, values of such constraint above this amount may warp the elastomer topology at the contact surface with the metal shell 11, thus violating the finite element model assumptions and inhibiting uniform compressive stress at the contact. The results in FIG. 4 also indicate that the samples with metallic inner masses buckle for smaller values of both ratios (lower surface 43) than those required for the samples having the elastomer masses (upper surface 41). Considering the rotationally-symmetric unit of the inclusion highlighted by the dashed section in the top right inset of FIG. 4, each radially-arrayed beam is axially constrained between the outer metal shell 11 and the inner mass. It is known that the presence of compliance in the boundary conditions of axially-loaded beams increases the loads required to buckle the beam, which verifies the finding here that the comparatively rigid metallic inner masses require smaller diametric ratios to load the inclusions at the elastic stability limit to exhibit desired hyperdamping effects. Using the insights derived from the finite element model analysis, hyperdamping metamaterials may be produced by embedding the strategically designed inclusions 50 into 50.4 mm thick open cell polyurethane foam 54 (such as that provided by Foam Factory, Inc., but not limited thereto), the foam 54 being cylindrical and having a diameter of approximately 82 mm in two equal thicknesses. Referring to FIG. 5, the foam 54 includes a centrally-located crevice 56, which may be formed by extracted a portion of the foam 54 where a hyperdamping inclusion 50 according to principles of the present invention is to be placed. The foam 54 and/or the hyperdamping inclusion 50 may be secured via spray glue (such as, but not limited to, HDX Spray Adhesive). A foam cylinder 54 formed accordingly is illustrated in FIGS. 5A and 5B. Portions of the foam 54 extracted to form the crevice 56 or other foam, may be positioned in the crevice 56 after placement of the hyperdamping inclusion 50. The entire assembly may be secured, for example by applying spray adhesive or glue into "one-piece". In forming the "assembly", glue or spray adhesive is lightly applied so as to not adversely impact the vibroacoustic properties of the polyurethane foam. By this fabrication, the resulting hyperdamping metamaterial specimen appears externally identical from the original cylinder of foam from which it was derived, apart from a small seam of spray glue visible around the perimeter. In addition, by extracting the inner material, the foam is not under additional stresses once re-assembled via the glue. In this example, the hyperdamping inclusions 50 constitute a 2% volume fill ratio respecting the whole metamaterial volume, and result in an effective metamaterial specimen density of 48 kg·m−3 (compared to the polyurethane foam density 34 kg·m−3). This is significantly less than the effective density of recent metamaterials leveraging resonance- and bandgap-based phenomena (around 1500 kg·m−3 or >2000 kg·m−3) and is more comparable to the density of various acoustical materials used in automotive and aerospace applications.

Figure 6:
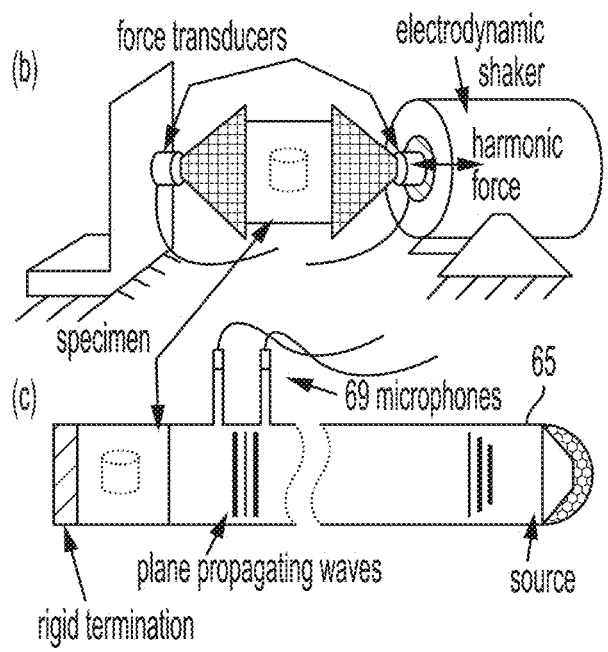
FIG. 6 shows force transmissibility and absorption coefficient experiment schematics.

FIG. 5 shows a hyperdamping metamaterial specimen according to principles of the present invention prior to assembly. FIG. 6 shows (b) force transmissibility and (c) absorption coefficient experiment schematics.

By a linear elastic finite model, the primary vibration modes of the inclusion 50 in the foam 54 occur around the frequency band 175 to 275 Hz. For the metallic inner mass, these relevant resonances are at the lower end of this band, while for the elastomer mass they are at the higher end. As a result, the greatest evidence of broadband energy absorption provided by the hyperdamping metamaterials will be found within this bandwidth. Above this frequency band, the modal density increases significantly per octave and the higher frequency modes are mostly associated with large deformations of the foam itself. Traditionally, periodic metamaterials are designed to leverage the lower frequency resonant modes for drastic vibroacoustic attenuation at the specific eigenfrequencies. In contrast, the hyperdamping metamaterial according to principles of the present invention, using only a single inclusion, facilitates strongly damped resonant properties in this frequency band, as well as at higher frequencies where the modal density grows. The result is a notably broadband, and hence robust, energy trapping and attenuation effect.

To characterize the impact of the hyperdamping inclusions, experiments were conducted with the foam on its own, having been previously cut in half and re-assembled by spray glue, and also with a conventional resonance-based metamaterial design that includes the foam and a single inclusion consisting of lumped elastomer (not shown) without radially arrayed beams cured in the metal shell 11 referred to as the "resonant metamaterial". The conventional approach is also similar to the strategy employed by the previous studies on poroelastic metamaterials where lumped mass (often metal) inclusions have been considered. All experiments are carried out in an environmentally-controlled room at 22.8° C. and 37% humidity. The force transmissibility through and acoustic absorption coefficient of the specimens are evaluated as schematically shown in FIG. 6. The resulting force transmissibility data represent the averaged result from 80 independent measurements when the electrodynamic shaker (LabWorks, ET-140) was driven with white noise filtered from 30 to 1500 Hz and data acquired using input and output force transducers (PCB Piezotronics, 208C01). The acoustic absorption data were derived from pressure measurements taken in the impedance tube 65 with the acoustic source providing white noise from 50 to 1600 Hz. Results from the 80 independent measurements obtained from the two microphones 69 (PCB Piezotronics, 130E20) were averaged, in accordance with ASTM E1050-12, to derive the absorption coefficient.

Figure 7:
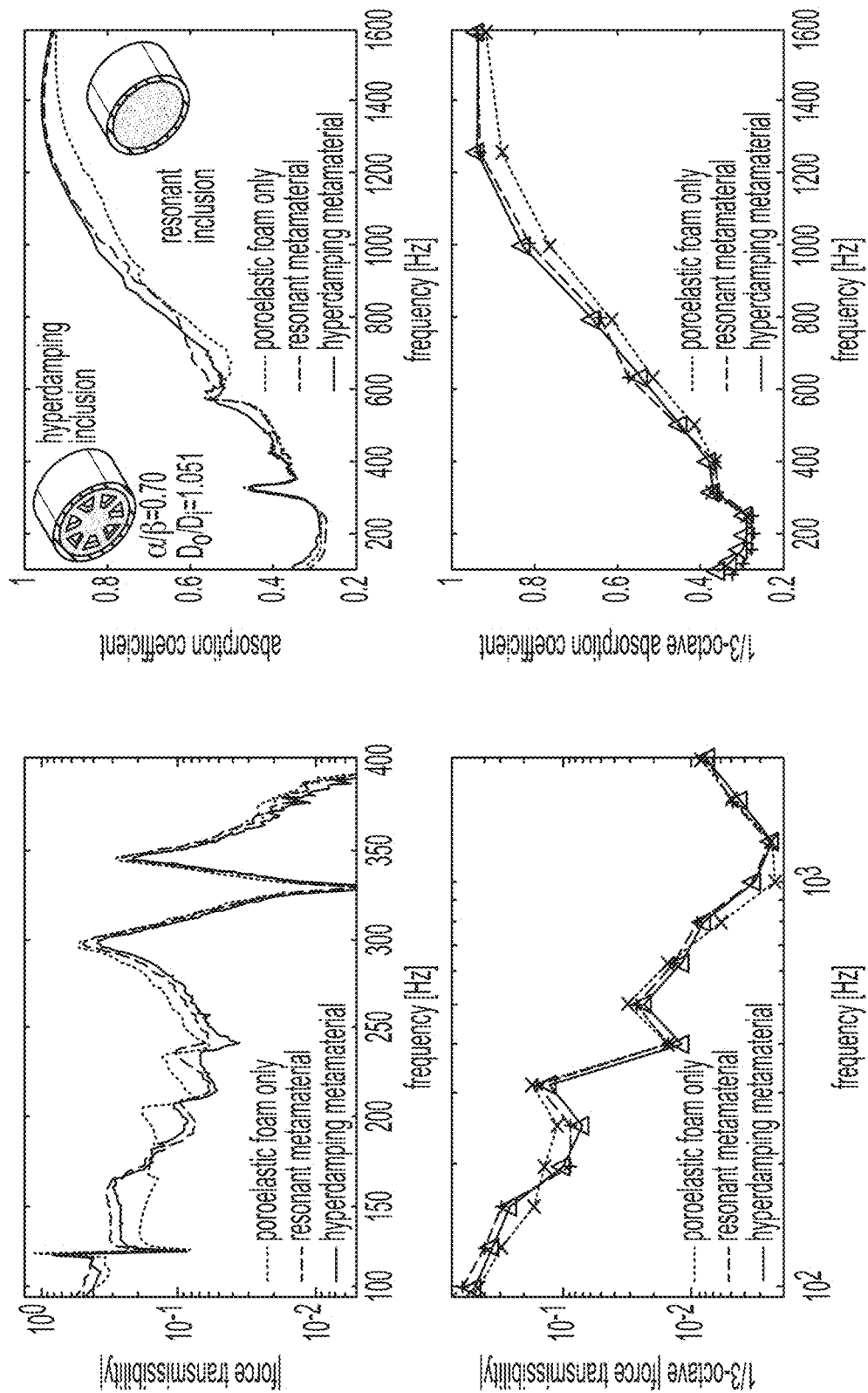
FIG. 7 presents the results of force transmissibility amplitude and acoustic absorption coefficient

FIG. 7 presents the results of force transmissibility amplitude (left column) and acoustic absorption coefficient (right column) for the poroelastic foam itself (dotted curves), the resonant metamaterial (dashed curves, and see (c) top right illustration), and the hyperdamping metamaterial (solid curves, and see (c) top left illustration) using a diametric ratio of $D_o/D_i=1.051$, elastomer inner mass, and rotational angle ratio $\alpha/\beta=0.70$. According to the finite element model results shown in FIG. 4, this diametric ratio is in excess of the ideal design at the elastic stability limit, and thus the hyperdamping specimen used in the comparison of FIG. 7 is not optimized. Optimization of the hyperdamping specimen may, in one example, be realized by selecting diametric ratio and rotational angle ratio from the finite element model results that are exactly at the elastic stability limit, in which case the buckling point is predicted. As described above, the modes associated with large displacement of the total mass of the exemplary inclusion occur in the frequency band 175 to 275 Hz, while modes below and above this range are mostly associated with large deformations of the foam itself. Thus, in FIG. 7(a), the measurements of force transmissibility (FT) reveal great similarity in response trends at frequencies outside of this range, while in the range there are notable differences to consider. For instance, the narrowband force transmissibility shows that the resonant and non-optimized hyperdamping metamaterials provide approximately similar reductions across the 175 to 275 Hz band, compared to the force transmissibility of the foam itself. This frequency band is associated with the principal resonant modes associated with large displacement of the total mass, as described above. However, considering the ⅓-octave band results shown in FIG. 7(b), from 200 to 630 Hz, the hyperdamping metamaterial provides an average of 1.2 dB greater force transmissibility reduction than the resonant metamaterial.

In addition, the absorption coefficients in the narrowband and ⅓-octave band comparisons of FIGS. 7(c) and 7(d), respectively, reveal similar enhancement of the acoustic wave attenuation by virtue of the inclusions. The results illustrated in FIGS. 7(c) and 7(d) show that a non-optimized hyperdamping metamaterial can provide comparable or greater absorption of vibroacoustic energy than a counterpart, resonant metamaterial, all the while the hyperdamping inclusion design constitutes only 48% of the mass of the resonant inclusion.

FIG. 7 shows measurements of narrowband and ⅓-octave band results of (a,b) force transmissibility amplitude (FT) and (c,d) acoustic absorption coefficient. Comparison is made among the (dotted curves) poroelastic foam itself, (dashed curves) the resonant metamaterial with lumped elastomer and shell inclusion (see (c) top right illustration), and (solid curves)

Figure 8:
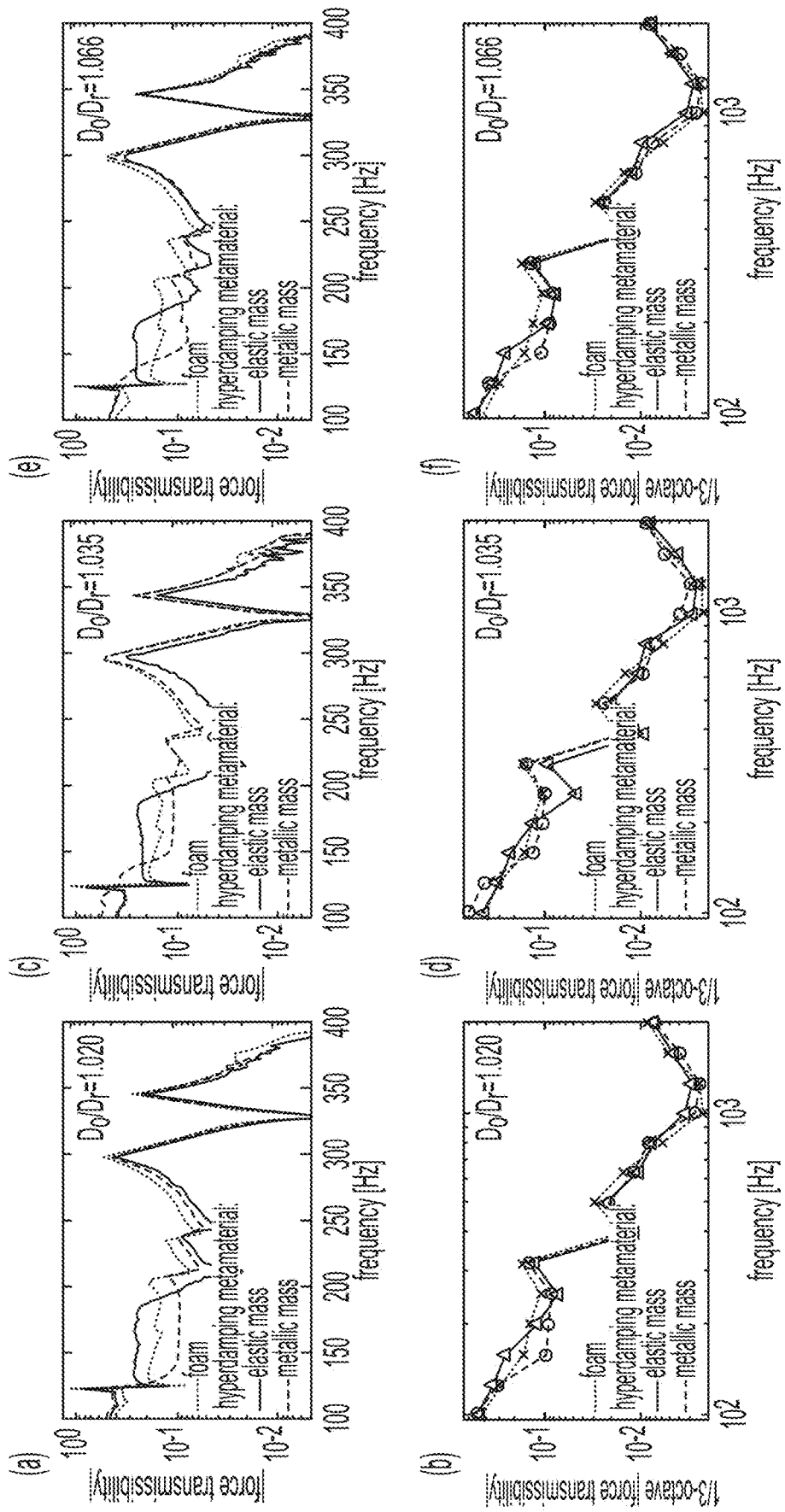
FIG. 8 shows that the broadband energy absorption and attenuation is prominent across the range of about 175-225 Hz.

Having assessed the merits of the hyperdamping concept with respect to the conventional resonant metamaterial approach, we next evaluate the impact of more effective hyperdamping inclusion design according to principles of the present invention as informed from the finite element model results of FIG. 4. In this way, we test the foundational hypothesis of this research that inclusion designs nearest to the elastic stability limit cultivate the greatest damping effects. FIG. 8 shows measurements of force transmissibility amplitude (FT). Dotted curves denote results for the control specimen; solid curves denote results for the hyperdamping metamaterial with elastomer inner mass; dashed curves denote results for the hyperdamping metamaterial with metallic inner mass. Narrowband and ⅓-octave band results for the hyperdamping specimen designs having diametric ratio (a,b) $D_o/D_i=1.020$, (c,d) $D_o/D_i=1.035$, and (e,f) $D_o/D_i=1.066$.

By the reductions in the force transmissibility amplitude with respect to the specimen consisting of only poroelastic foam, the measurements in the top row in FIG. 8 show that the broadband energy absorption and attenuation is prominent across the range of about 175-225 Hz for the hyperdamping specimens having the metallic inner mass, FIG. 8(a), while for the specimens with elastic inner mass the energy capture is more apparent around 200-275 Hz, FIG. 8(c). The finite element model results in FIG. 4 indicate that the critical design point occurs for smaller values of the diametric ratio $D_o/D_i$ using the metallic inner masses, when the rotational angle ratio α/β is held constant. The force transmissibility measurements in both the narrowband and ⅓-octave evaluations of FIG. 8 verify this design methodology. Namely, the hyperdamping metamaterial with metallic inner mass generates greater broadband energy dissipation for the smaller ratio $D_o/D_i=1.020$ (29.1% mean reduction of FT in ⅓-octaves from 157 to 630 Hz with respect to the control specimen) while the specimen with elastomer inner mass yields maximum broadband performance for a greater ratio $D_o/D_i=1.035$ (41.2% mean enhancement of FT reduction in ⅓-octaves from 250 to 630 Hz with respect to the control specimen). The reductions to force transmissibility well above the primary resonances of the inclusions in the poroelastic material are due to the increasing modal density, which occurs above about 275 Hz, thus introducing means to magnify the energy dissipation properties in the mid frequency range. These are significant increases in the broadband absorbed and attenuated vibration energy, particularly considering that the hyperdamping inclusions account for only 2% of the total specimen volume.

These enhancements to the energy dissipation are reduced if the diametric ratio is changed to be deliberately away from the elastic stability limit. For example, the specimens having the metallic inner masses are less effective in the broadband reduction of FT when $D_o/D_i>1.020$, FIGS. 8(c) and 8(e), which corresponds to post-buckled configurations of the elastomer element as observed empirically; specimens with elastomer inner masses have reduced energy attenuation performance for $D_o/D_i>1.035$, FIG. 5(e), which likewise corresponds to post-buckling of the elastomer element. These results validate the hypothesis of this research that the hyperdamping effects are due to the extreme softening of the inclusions and not simply to compressing the inclusions beyond the buckling point.

Figure 9:
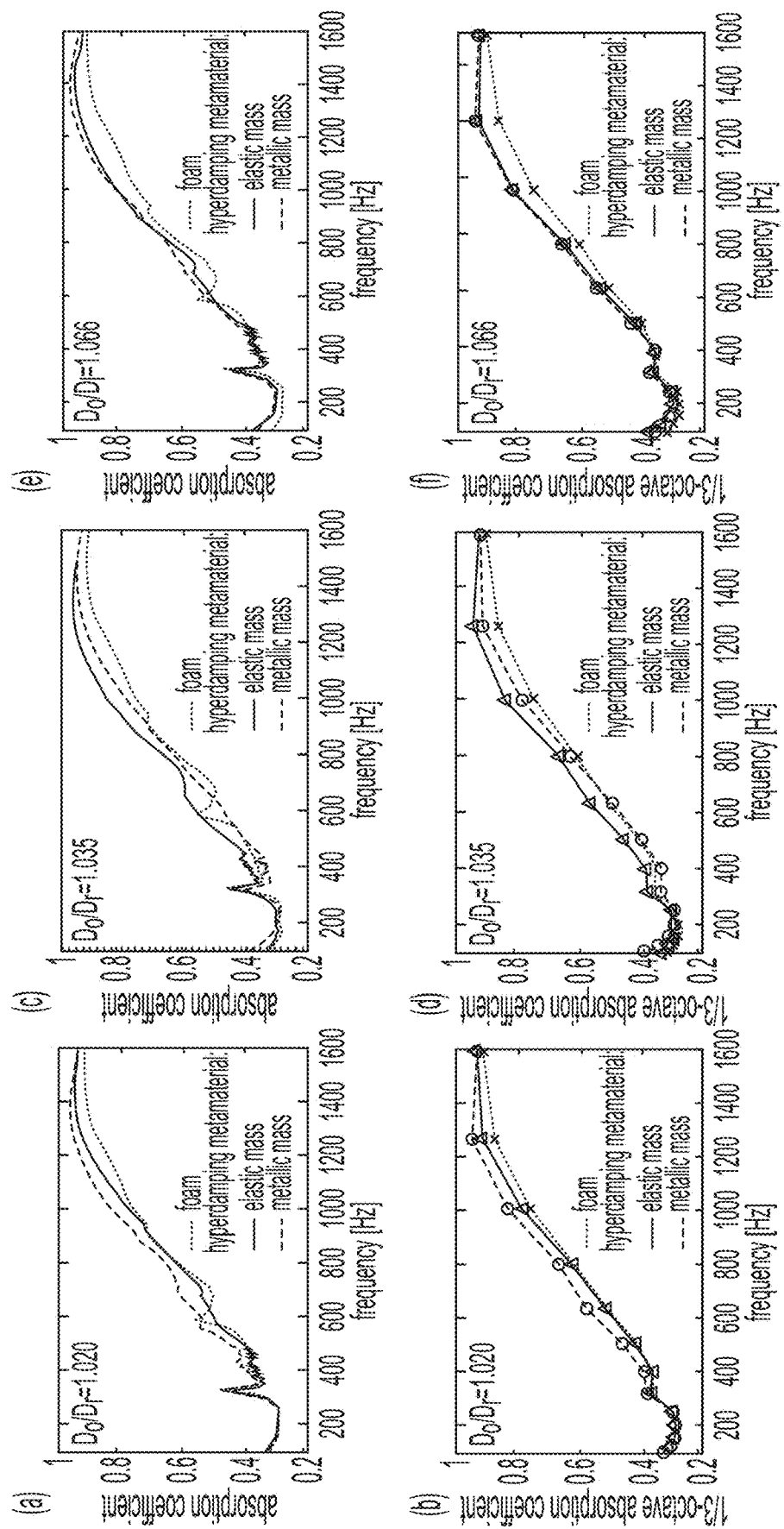
FIG. 9 shows measurements of absorption coefficient.

FIG. 9 shows measurements of absorption coefficient. Dotted curves denote results for the poroelastic foam-only "control" specimen; solid curves denote results for the hyperdamping metamaterial with elastomer inner mass; dashed curves denote results for the hyperdamping metamaterial with metallic inner mass. Narrowband and ⅓-octave band results for the hyperdamping specimen designs having diametric ratio (a,b) $D_o/D_i=1.035$, (c,d) $D_o/D_i=1.051$, and (e,f) $D_o/D_i=1.066$.

The top row of FIG. 9 presents narrowband measurements of absorption coefficient, while the bottom row provides the corresponding ⅓-octave band results. Of note, the polyurethane foam is itself very acoustically absorptive such that enhancement of this property using a single, embedded hyperdamping inclusion appears to be a challenging goal at the outset. Yet, as seen in the top row of FIG. 6, due to the presence of the hyperdamping inclusions the absorption coefficient of the baseline poroelastic foam is increased from frequencies of about 400 to 1400 Hz, across which the modal density is sufficiently great. This improvement is greater for the inclusions having metallic masses when employing the smaller value of the diametric ratio, FIG. 6(a), $D_o/D_i=1.035$, which agrees with the FE model predictions. Using this inclusion composition, across the 500 to 1260 Hz ⅓-octave bands the mean absolute enhancement of the absorption coefficient over control specimen levels is 0.063, as shown in FIG. 9(b).

Hyperdamping inclusions with elastomer inner masses according to principles of the present invention are more effective at increasing the energy dissipation (and hence absorption coefficient) for a greater value of diametric ratio, FIG. 9(c), yielding a mean absolute absorption coefficient improvement from the control specimen results of 0.045 across the 500 to 1260 Hz ⅓-octave bands, FIG. 9 (d). Indeed, for both of the exemplary designs that strategically leverage the hyperdamping effect, the increase in the absorption coefficient over the control specimen is generally uniform across this broad frequency band. FIGS. 9(e) and 9(f) show that the performances of the specimens are reduced from the peak achievements realized when the elastomer elements are compressed around the elastic stability limit, for example, when the inclusions are constrained by diametric ratios greater than the exemplary values. The exceptional softening of the inclusion design is the origin of the hyperdamping effects, which invests the metamaterial with remarkable, broadband vibroacoustic energy dissipation properties using a negligible change (2%) to the host media volume due to the embedded inclusion.

Figure 10:
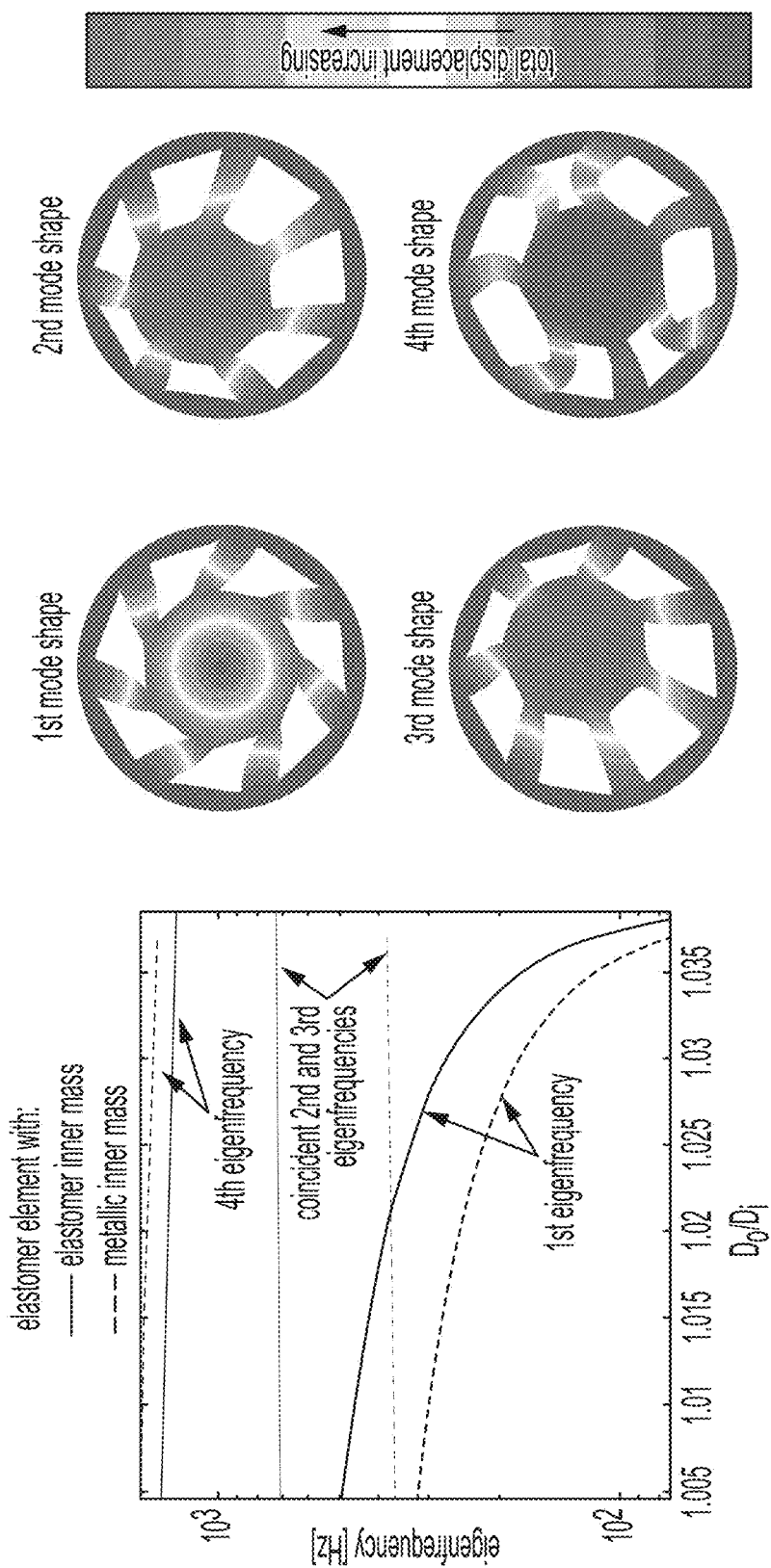
FIG. 10 shows a comparison of eigenfrequency variation among the four lowest eigenfrequencies and the corresponding mode shapes.

The finite element (FE) model to study the effective topological composition of the hyperdamping inclusions utilizes the geometry exemplified in FIG. 4 at the top inset, assuming plane strain conditions apply for a first approximation of the principal eigenfrequencies and modes. Material properties are therefore required for inner metal cylinders (if applicable) and for the elastomer elements. The steel metal cylinders are modeled as a linear elastic material having density, Young's modulus, and Poisson's ratio, respectively, ρ=7800 kg·m−3, E=200×109 Pa, and ν=0.30. Previous studies have indicated that similar variants of the silicone used here to create the elastomer elements are adequately characterized using Neo-Hookean, hyperelastic material models. In such cases, the strain energy density is expressed using $$W = \tfrac{1}{2}\mu_0(\bar{I}_1 - 3) + \tfrac{1}{2}K_0(J-1)^2$$

where $\mu_0$ and $K_0$ are the initial shear and bulk moduli, J=det F is the determinant of the deformation gradient F=∂x/∂X found respecting the current x and reference X configurations, and $\bar{I}_1 = \mathrm{tr}(\bar{F}^T\bar{F})$ is computed from the distortional tensor $\bar{F} = (J^{1/3}I)^{-1}F$ where I is the identity matrix [1]. For the silicone material employed in this research, representative parameters of $\mu_0=250$ kPa and $K_0=6.25$ MPa are employed in the FE computations while the density is ρ=1145 kg·m−3 as measured. The boundary conditions constrain the normal displacement of the elastomer element outer diameter in accordance with the constraint imposed by the ratio $D_o/D_i$. An eigenfrequency analysis is carried out to evaluate the influence upon the lower-order eigenfrequencies due to the variation in the ratios α/β, which characterizes the unconstrained topology of the elastomer element, and $D_o/D_i$ which quantifies the nearness to the critical buckling stress upon the elastomer element topology. However, a design theme of the heretofore described examples is that sculpted beams that support an internal mass must be arrayed radially from the inclusion center, otherwise the compression provided by the geometric shell constraint would be prevented from causing a buckling of the topology. To illustrate the change in the lower order eigenfrequencies in consequence to the constraint imposed by the metal shell, FIG. 10 shows results from this finite element model for the case in which the rotational angle ratio α/β=0.70 while the diametric ratio $D_o/D_i$ is varied. From the finite element model results at right, it is evident that the second, third, and fourth eigenfrequencies do not significantly change due to the critical stressing that occurs when the elastomer element topology is designed to lead to buckling effects.

FIG. 10 shows a comparison of eigenfrequency variation among the four lowest eigenfrequencies (at left) and the corresponding mode shapes (at right). The dotted curves at right indicate that the inner mass of the inclusion is metallic while the solid curves indicate results when the inner mass is composed of the elastomer material.

The finding that the second, third, and fourth eigenfrequencies do not significantly change due to the critical stressing may be explained by the fact that these mode shapes are not rotationally symmetric, as shown in the right part of FIG. 10, while the constraint that leads to buckling is one which uniformly applies to the elastomer element around the full perimeter.

A finite element model can be used to assess the distribution of the structural eigenfrequencies and modes for the hyperdamping inclusion once embedded into the polyurethane foam. By such an evaluation, one is able to more effectively assess the impact of the inclusions since the greatest magnification of the damping effects are around the frequencies associated with these resonances, assuming they are significantly excited by the source input. As observed macroscopically, the result will be that these resonances, often associated with resonance-based metamaterials, will appear to be strongly damped.

The finite element model geometry is the same as the experimental geometry as detailed with respect to FIGS. 5 and 6. In this model, the polyurethane foam is considered to be a linear elastic material. Thus, poroelastic coupling is neglected, which is justified by the focus on small-amplitude, relatively low frequency force transmissibility and acoustic-elastic wave propagation, where the linear elastic characteristics of the polyurethane foam are more apparent. The polyurethane material properties are given to be $\rho=30$ kg·m−3, $E=7\times10^4$ Pa, and $v=0.41$. The inclusion is modeled as an effective lumped mass of uniform density, Poisson's ratio $v=0.33$, and high stiffness $E=200\times10^9$ Pa in accordance with the assumption that it is only a cylindrical mass embedded into the foam. The uniform density of this mass is therefore the average mass of the inclusions for a given $D_o$ (whether with inner elastomer or metallic cylindrical mass) divided by the inclusion volume. Consideration of the inclusion as a uniform body is theoretically justified by the fact that the vanishing fundamental eigenfrequency of the hyperdamping inclusion means that the natural frequencies of the composite inclusion components (shell and elastomer element) as embedded into the foam media are primarily due to the total dynamic mass of the composite. This contrasts to considering the inclusion internals as possessing additional degrees of freedom; under the unique condition of the buckling constraint which yields the hyperdamping effects, the vanishing principal stiffness contribution indicates that the effective response of the inclusion is significantly first-order and more representative of a damping effect rather than like an additional mass-spring-like degree of freedom.

Figure 11:
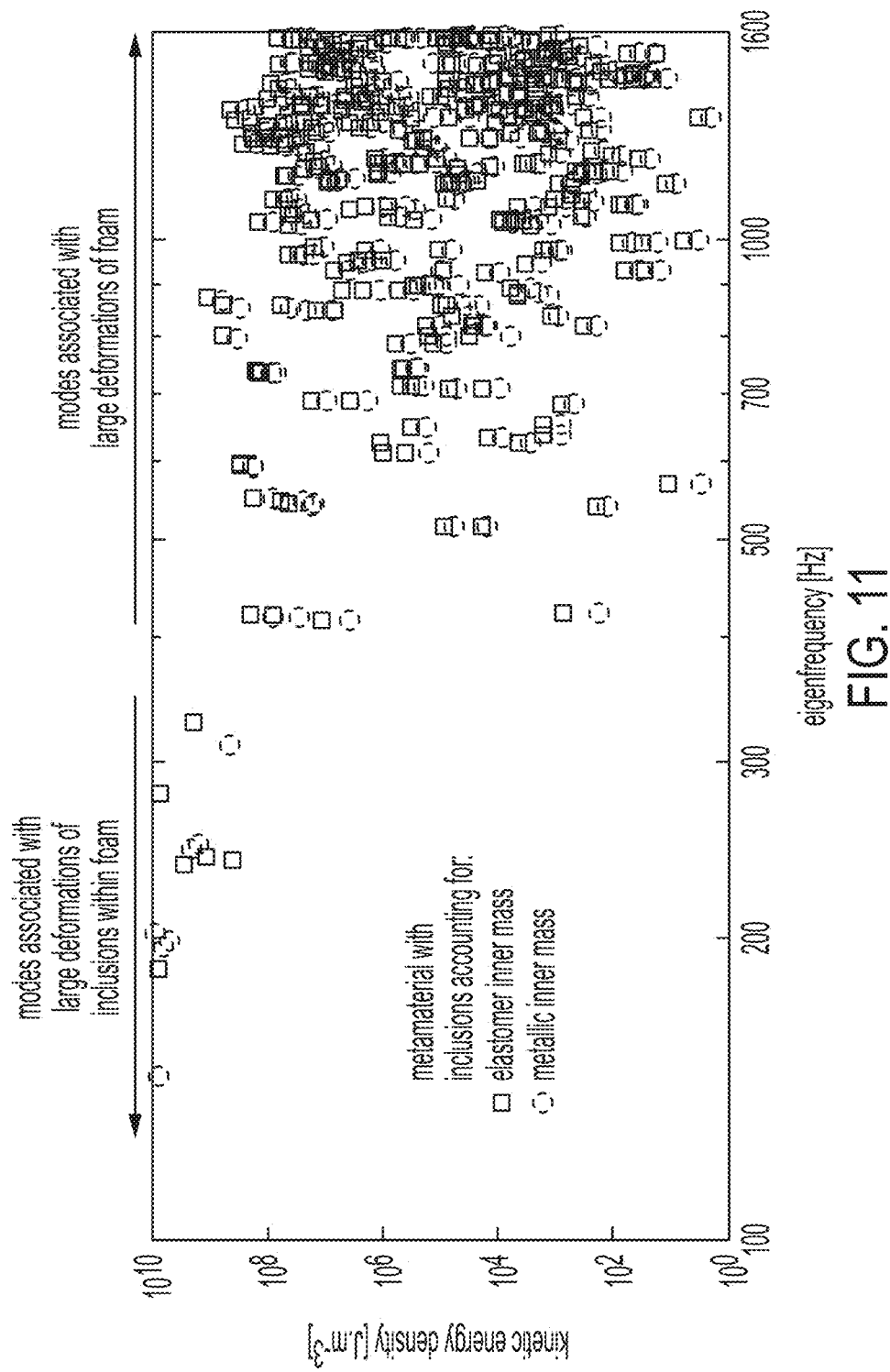
FIG. 11 illustrates eigenfrequency distribution and corresponding kinetic energy density of finite element analyses of materials according to principles of the present invention.

In this finite element model, one circular surface of the metamaterial is fixed while the opposing circular face is free to move in the direction normal to the surface but may not rotate. The results of the finite element analyses are shown in FIG. 11 in terms of the kinetic energy density associated with each eigenfrequency. FIG. 11 illustrates eigenfrequency distribution and corresponding kinetic energy density of the mode. Squares indicate the results in which the lumped cylindrical inclusions are characterized according to the average density of hyperdamping inclusions with elastomer inner masses, while the circles denote the result respecting hyperdamping inclusions with metallic inner masses. Thus, the plot provides information on the spectral distribution of the eigenmodes, as well as of the significance of the global system energy associated with the mode. The square data points indicate the FE model results in which the lumped cylindrical inclusions are characterized according to the average density of hyperdamping inclusions with elastomer inner masses (approximately 1238 kg·m−3), while the circles denote the results respecting hyperdamping inclusions with metallic inner masses (approximately 2090 kg·m−3). The modes are found to be the result of three primary phenomena. The lowest frequency mode in each case is associated with uniform (in-phase) compression/elongation of the metamaterial and inclusion. A mid frequency range of modes occurs wherein the inclusions are seen to exhibit large deformations and/or rotations within the foam, while the corresponding eigenfrequencies occur at values corresponding to the total inclusion mass (and are thus distinct comparing the two inclusion types shown in FIG. 11). As a result of these large excursions of the inclusions, the greatest broadband damping effect is anticipated to occur in this bandwidth around 175 to 325 Hz. Finally, a higher frequency range of modes occurs characterized by large deformations of the foam while the inclusions are relatively stationary. Since there is comparatively little displacement of the inclusions in contribution to these modes, they occur at almost the same frequencies when considering the two types of inclusions evaluated in FIG. 11. These results exemplify the fact that energy trapping occurs primarily at the lower frequencies associated with a select number of resonances possessing high kinetic energy density while at high frequencies the energy loss is due to highly modal density resulting in stochastic-like vibrations that resistively dissipate energy. Thus, this helps to explain why the energy trapping appearing in the force transmissibility experiments (FIGS. 4 and 5 main text) is mostly localized in the frequency band <600 Hz while the absorption coefficient measurements (FIGS. 4 and 6 main text), which do not significantly excite lower frequency modes, give greater indications of the high frequency losses associated with the lower-energy and higher frequency modes that are finely spaced apart in the spectrum.

Figure 12:
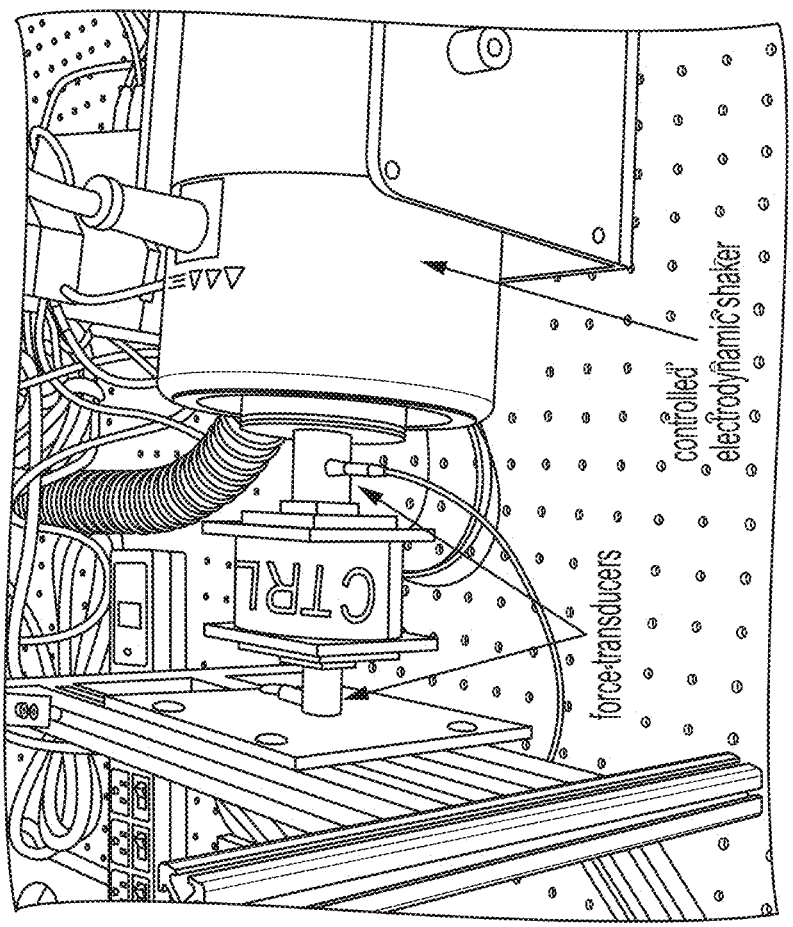
FIG. 12 shows force transducers used in experimental testing of materials according to principles of the present invention.

Force transmissibility experiments were conducted using the arrangement shown in FIG. 12. The experiments are carried out on an optical isolation table to prevent potential building motions from interfering with the measurements. White noise filtered from 30 to 1500 Hz is used to drive the electrodynamic shaker which acts on the input force transducer. An output force transducer is attached to a grounded, rigid aluminum frame. As illustrated in FIGS. 5 and 6 and as shown in FIG. 12, the force transducers are affixed to force expanders composed from acrylic PMMA which are many orders of magnitude stiffer than the polyurethane foam. The expanders' stiffness inhibits the possibility that the measured forces are different than those transmitted to the hyperdamping metamaterial specimens. The expanders also ensure that the force is equally distributed across the full surfaces of the cylindrical metamaterial specimen so as to evaluate only the one-dimensional force transmissibility property of the specimens through their thickness. Acquired data are sampled at 16384 Hz and are filtered from 20 to 2000 Hz using a fourth-order bandpass infinite impulse response filter prior to further computation. Then, the force transmissibility of the 80 independent measurements is determined and the average of the results is taken. One-third-octave band values are taken in conformance to traditional methods.

Figure 13:
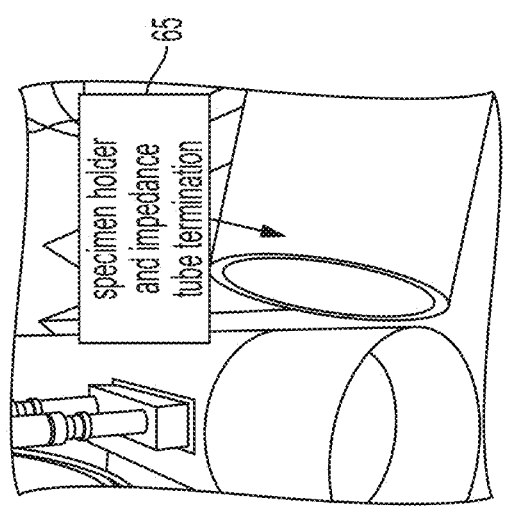
FIG. 13 shows an impedance tube setup used in experimental testing of materials according to principles of the present invention.

Absorption coefficient measurements were taken using the impedance tube setup as shown in FIG. 13. The tube length from acoustic source to specimen surface is approximately 575 mm. The cylindrical metamaterial specimens are mounted in a way such that the surface of the specimen which faces the propagating wave is normal to the direction of wave propagation, ensuring that reflections are likewise normal. Data from the microphones are sampled at 51200 Hz and filtered from 20 to 2000 Hz using a fourth-order bandpass infinite impulse response filter prior to further computation. Then, the acoustic absorption coefficient as determined from the 80 independent measurements is averaged. One-third-octave band values are computed according to traditional methods.

Although the elastomeric inclusions are described embedded in poroelastic foam, favorable damping properties exhibited through use of the elastomeric inclusions according to principles of the present invention do not require the surrounding poroelastic foam as illustrated in FIG. 3. Instead the favorable damping properties are exhibited by the constrained elastomer inclusion itself in whatever application it is employed.

As another example application, this inclusion design may be directly embedded into structural panels, such as dash or trim panels in vehicular systems, where flexural vibrations and transmitted sound will be extremely abated. Another example would be to use a constraint imposed by pre-load/stress (such as occupant weight on a seat cushion or engine weight on engine mount) to simplify the design to utilize only the inclusion component (i.e., no 'shell' component) while the radially-arrayed beams of the inclusion topology are nearly buckled in consequence to the surrounding, pre-load/stress.

In fact, elastomeric materials are in common use as dampers, isolators, or fillers due to their large damping provided at mid-to-high frequencies. An advantage of an elastomer inclusion according to principles of the present invention is that the sculpting of the elastomer removes material from the underlying non-engineered bulk elastomer material, making the hyperdamping materials lighter in weight than their counterparts. Moreover, as shown in FIG. 3, the hyperdamping materials attenuate greater structure-borne sound energy at low frequencies than the baseline non-engineered bulk elastomer materials. These factors show that elastomer inclusions according to principles of the present invention provides higher energy attenuation performance using less material mass than existing vibration/noise control treatment approaches.

In order to achieve the advantages of the present inclusion, the shell or "constraint" needs to be effectively rigid with respect to the inclusion material that is constrained to achieve the near-buckling described herein. To that end, the constraint does not need to be a different material. If the whole system is an elastomer and somewhere within the elastomer is the architecture of the radially-arrayed beams or similar beam constituents (they could be in a line of beams, for instance similar to column arrangements in architectural contexts), then when that whole elastomer system is under pre-load, the internal beam sub-components will be much more stressed than the whole and will nearly buckle, as is desired to yield the hyperdamping effect. The choice of the constraint material can be chosen according to final engineered product, provided that it achieves the desired pre-load.

Figure 14:
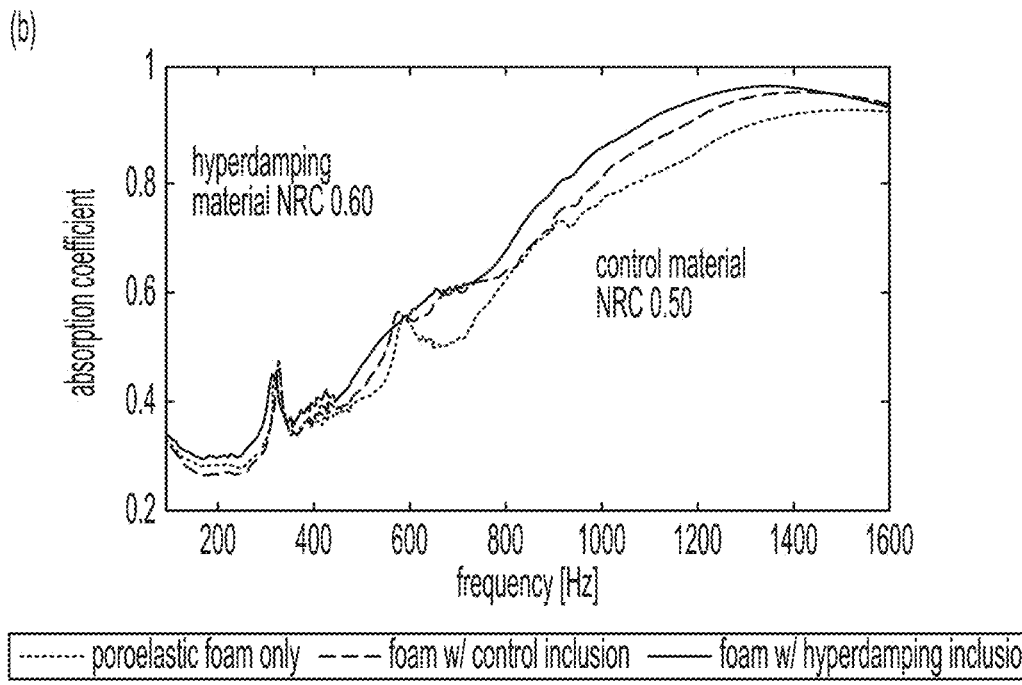
FIG. 14 is a graph illustrating absorption coefficient performance of an exemplary hyperdamping inclusion according to principles of the present invention versus a control inclusion and poroelastic foam alone.
Figure 15:
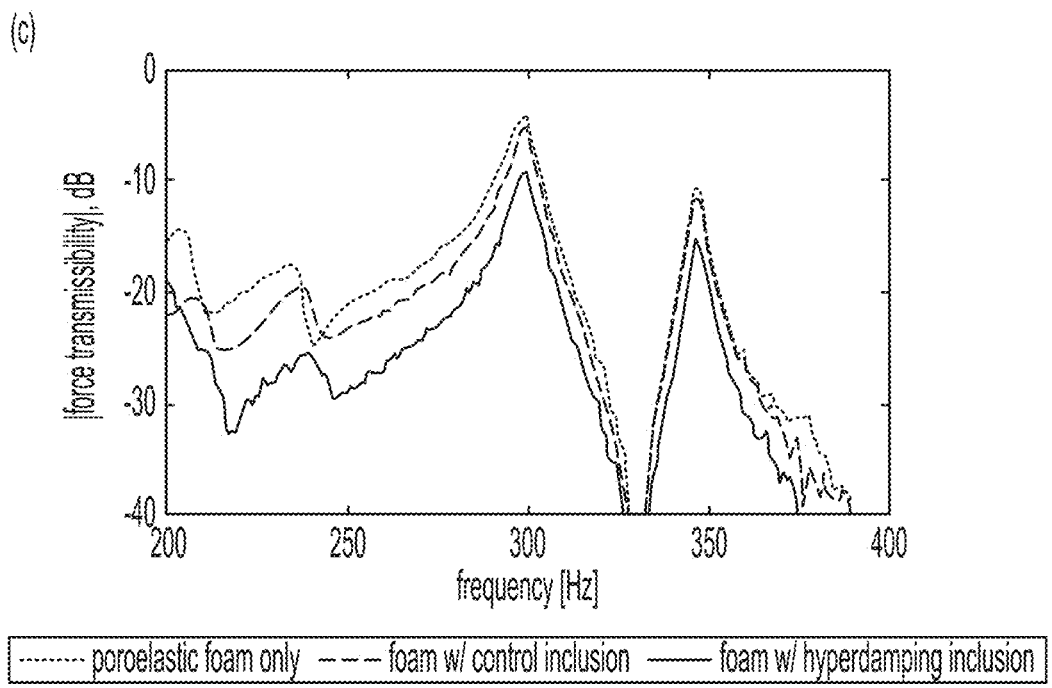
FIG. 15 is a graph illustrating force transmissibility performance of an exemplary hyperdamping inclusion according to principles of the present invention versus a control inclusion and poroelastic foam alone.

As illustrated in FIGS. 14 and 15, acoustic absorption coefficient and force transmissibility are compared for cylindrical samples of poroelastic foam with or without inclusions. One exemplary inclusion is considered a "control." This exemplary control inclusion consists of a solid cylinder with elastomer that has been poured inside of a metal shell. The other exemplary inclusion considered is a "hyperdamping inclusion" made from the same "batch" of elastomer that was used for the control inclusion, but made according to principles of the present invention. Yet, by the strategic sculpting and design, the hyperdamping inclusion is only about 48% of the mass of the control, indicating a great weight savings.

Figure 16:
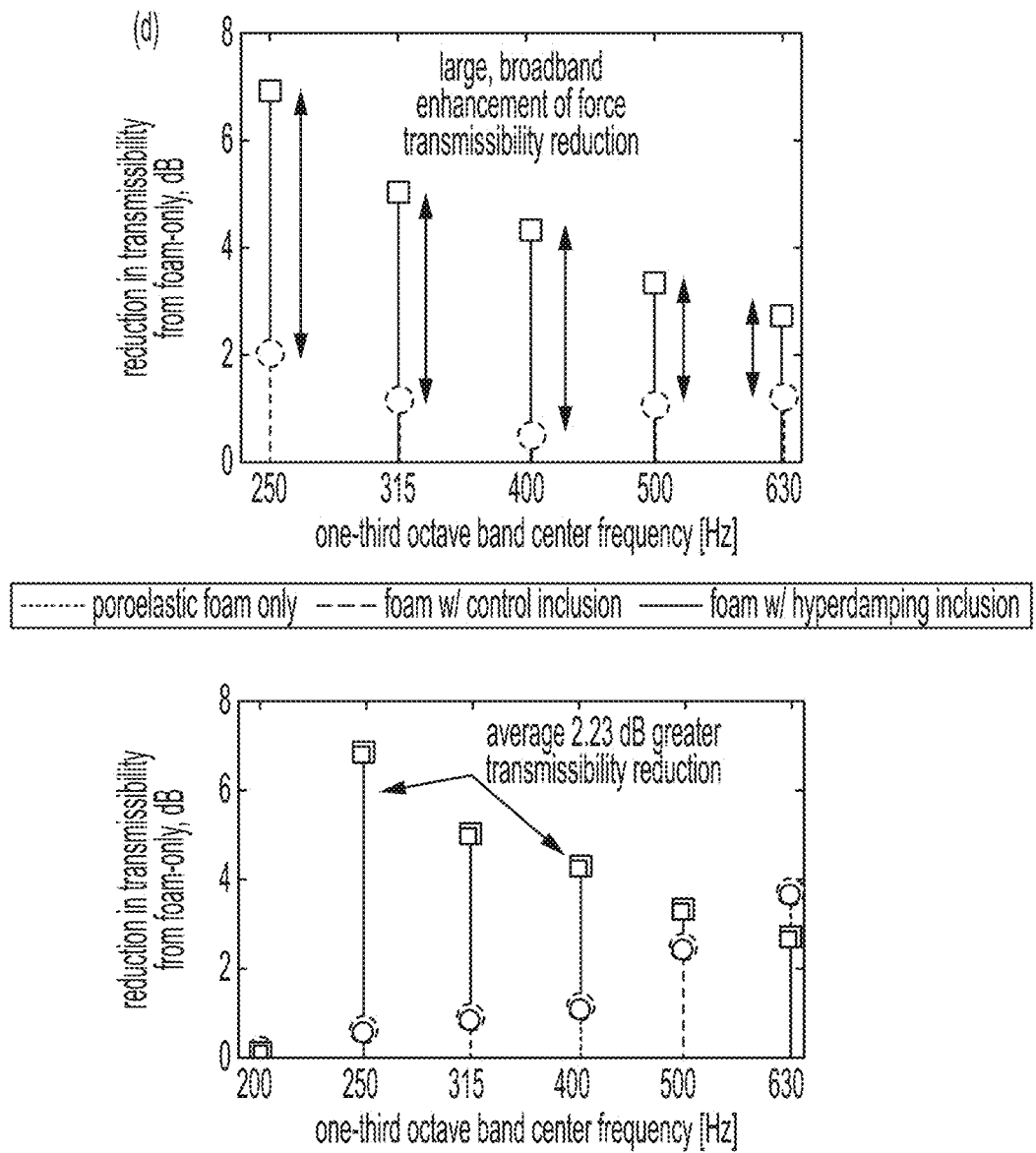
FIG. 16 is a graph illustrating one-third octave ban measurements of force transmissibility of an exemplary hyperdamping inclusion according to principles of the present invention versus poroelastic foam alone.

Experimental measurements of acoustic absorption coefficient of the control inclusion and the inclusion according to principles of the present invention are presented in FIG. 14. Over almost all of the frequencies, the hyperdamping inclusion provided increased absorption coefficient, and thus increased attenuation of air-borne acoustic energy, than both the poroelastic foam alone and the poroelastic foam with the control inclusion. The noise reduction coefficient (NRC) from 250 to 1,000 Hz of the control material is 0.50 in comparison to the NRC from 250 to 1,000 Hz for the hyperdamping material of 0.60. The narrow band measurements of force transmissibility through the samples are shown in FIG. 15. FIG. 16 shows the corresponding one-third octave band reductions in force transmissibility from the foam-only case.

The wide-band reductions in transmissibility seen in FIG. 15 as provided by the hyperdamping material/inclusion indicate a substantial increase in the structure-borne sound attenuation compared to the poroelastic foam-only and the control material sample. The enhanced transmissibility reductions are verified in the one-third octave band evaluations in FIG. 16, showing that the lighter weight hyperdamping material provides significantly greater broadband vibration and acoustic energy attenuation. These exceptional properties—lightweight, and high damping across broad frequency bandwidth—are derived from the strategic designs and manufacturing methods of the hyperdamping inclusions as described herein.

According to the design, the constituent that is stressed or loaded near the elastic stability limit is not limited to be an elastomer. Elastomer is utilized for proof-of-concept specimens due to its high compliance compared to the metal shells that provide geometric constraint, which results in a 'room-for-error' in design. Stiff or metallic structures at the elastic stability limit may be used to realize the hyperdamping effect with appropriate control of tolerances. Materials softer than the previously-described elastomer for the hyperdamping inclusion, such as a sculpted foam, may be used to realize the hyperdamping effect, given appropriate attention to the fact that increased compliance of the softer materials may result in the need for appropriate tolerance control. Such flexibility for material selection enables broad implementation opportunities.

Acoustic and/or elastic wave attenuation pertains to vibrations at all frequencies, wave propagation at all frequencies, and transient phenomena such as impulsive and blast energies.

Acoustic and/or elastic wave attenuation by embedding or sculpting inclusions according to an aspect of the present invention within host media (where the inclusions are the same material as the host media) and where the host media is under static pre-load, thus omitting use of additional constraint layer (e.g. metal shell described). Such "unconstrained" inclusion is illustrated in FIG. 1 separated from the metal shell. This implementation creates an internal one-degree-of-freedom internal system that can attenuate waves, vibrations, shock, and sound.

Such unconstrained device can be used in various applications, such as, but not limited to: architecting polystyrene foam acoustic/thermal insulation with the beam sub-components that is pressed between studs and drywall in homes; concrete road surfaces with internal beam-like architectures that better attenuate road noise, and using similar concepts in concrete road noise barriers that have high static pre-load by virtue of their self-mass; sculpting the foam of a vehicle seat, such as in cars, to have internal beam-like architecture so that when an occupant rests on the seat, the pre-load provided by the individual serves to compress/constrain the beams near to their buckling point resulting in a large suppression of energy to the seated occupant when the seat is excited by input vibrations and shock; sculpting carpets, pads, and other floor coverings that are underload by virtue of moving mass (people walking, objects rolling, etc), and building insulation materials for large sound transmission loss between rooms and residences The inclusion geometry of beams that is created within the carpet/pad/covering material can be designed to be constrained near to the buckling point for a range of supported loads so that energy is less transferred through the carpet/pad/covering and to the floor below (such as to an under-story residence); in other automotive, civil, aerospace, space, marine, or rail applications where all-metal realizations of the concepts are desired, the geometry of slender internal beams may be machined or otherwise cut into a host material such as a metal or plastic or wood, carpets and pads in vehicle systems, such as aircraft or automobiles, to deaden structure-borne noise (i.e. vibration and wave energies that may also radiate to become sound).

Filler material for sandwich panels, such as filler for aluminum honeycomb panels in aircraft, to dissipate operational vibrations. When the system is subjected to excitations and loads, the internal components undergo greater oscillation by virtue of the locally reduced stiffness (associated with the near buckling beam elements) and thus provisioning the system with anomalous damping properties associated with these elements.

Acoustic and/or elastic wave attenuation by embedding or sculpting inclusions according to an aspect of the present invention and held within constraining layers/shells, such as a metal shell, within host media that are under static pre-load. The use of the constraining layer or shell is to provide for added resonant mass and generates a two-degree-of-freedom internal system that can attenuate waves, vibrations, shock, and sound, with potential for greater effect at low frequencies than the above examples. These inclusions are thus self-enclosed and can be injected or otherwise inserted into other media.

Such constrained devices can be used in various applications, including those listed above, as well as, but not limited to: foam insulation in building construction wherein such inclusions are a part of the foam-making (blowing) process and become members of the foam layer; room and office partitions, cubicle dividers, and so on with internal inclusions for enhancing noise insulation properties. An inclusion according to these principles provides for broadband and low frequency noise control enhancement and thus may be used in any structure where such frequency damping is desired.

Acoustic and/or elastic wave attenuation by embedding inclusions within structural members, where the latter members serve as components of a greater system. For example, inclusions according to principles of the present invention may be used within vehicle frame component, such as the subframe, A- or B-pillars, and other automotive components; in aerospace/space components as in within sandwich panels (that are a staple aircraft construction) or within the stingers of aircraft wings, and in rail-transport frame members having hollow geometries. These inclusions may be inserted into all such geometries and be naturally compressed within the host geometry. For instance, the subframes of automobiles often have cylindrical-like extruded geometries wherein a conventional cylindrical hyperdamping inclusion may be designed and embedded. Thus, when the host system is under acoustic/elastic wave excitations, the embedded hyperdamping inclusions will effectively attenuate the energies prior to their delivery further downstream to delicate vehicle locations (such as an occupant seat attached to a vehicle chassis).

Inclusions according to principles of the present invention may be used in civil or structural engineering applications where C, U, and box-beam members compose the structure. Into such C, U, or box channels can be inserted the inclusions that would be targeted to be under the desired compression constraint to yield near-buckling of the beam components. Thus, when the structure is under wind or seismic or machine-induced loads (like HVAC on roof), the inclusions can abate transfer of the energy into motions of the structure by the damping of energy at the inclusion.

Inclusions according to principles of the present invention may be used in applications of seals, where the seal is compressed in order to prevent leakage of flow of liquid or gas but the compressed structural piece (such as a cap, door, or trim) is also desired to not vibrate due to exterior structural or acoustic loads. Thus, the hyperdamping-type seal may have a cross-section geometry that includes beam components that when under the working condition of the seal (where it is compressed) both provides the demanded flow prevention and enhances damping of the structural piece that compresses it down via the greater damping properties borne out by the compressed internal geometry.

Inclusions according to principles of the present invention may be used as shock/vibration absorbers for electronics where the hyperdamping inclusions serve to support the load of the electronics while promoting large attenuation of the input energy from transmitting to the supported layer of electronics. The inclusions would be designed such that their supported load or pre-compression extent capitalizes on the hyperdamping phenomenon.

Figure 17:
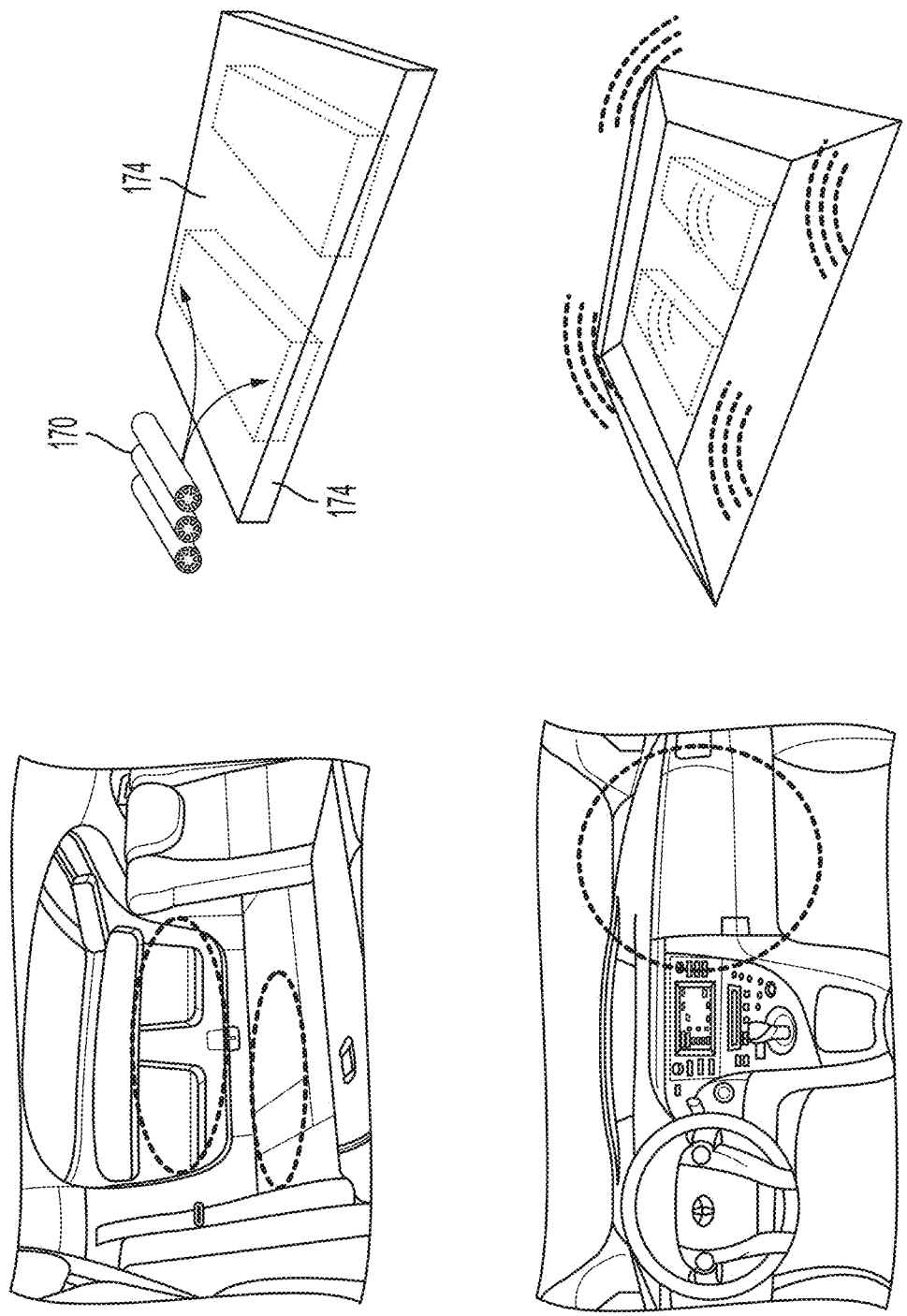
FIG. 17 illustrates an exemplary use for inclusions according to principles of the present invention.
Figure 18:
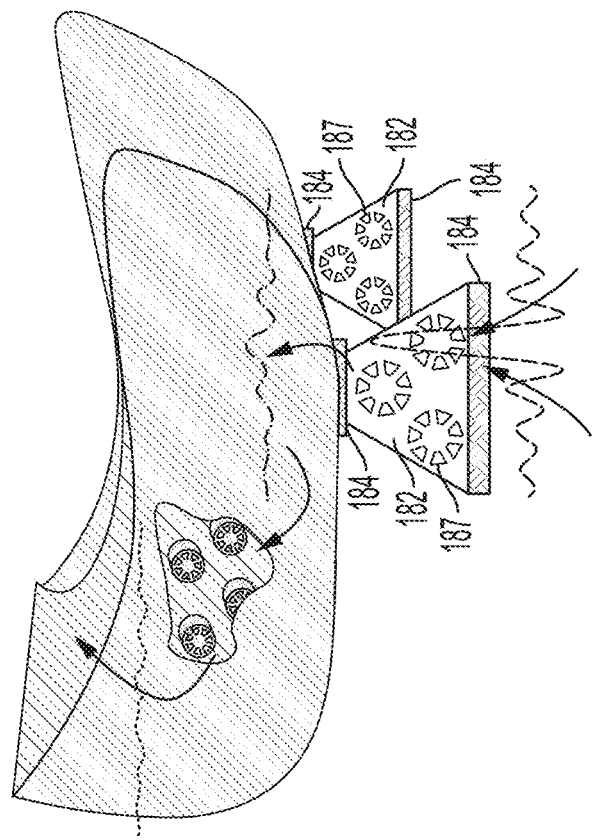
FIG. 18 illustrates an exemplary use for inclusions according to principles of the present invention.
Figure 18:
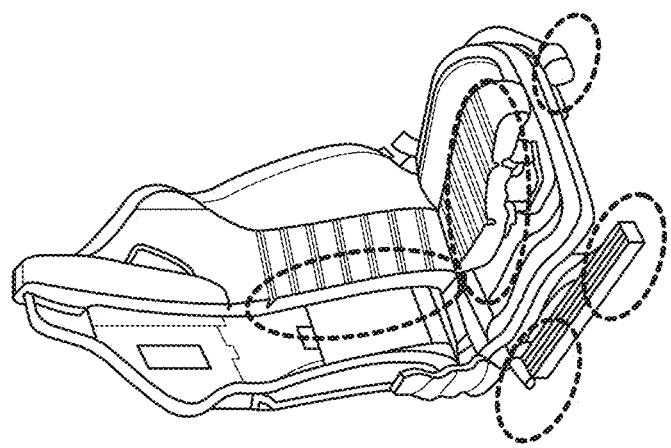
Figure 19:
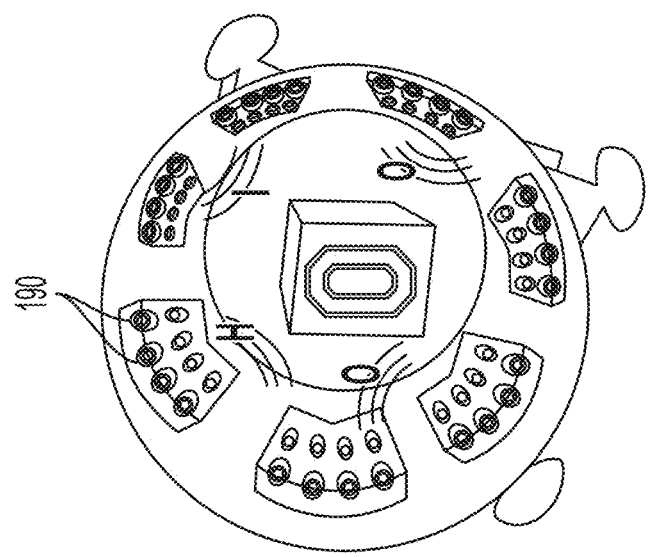
FIG. 19 illustrates an exemplary use for inclusions according to principles of the present invention
Figure 19:
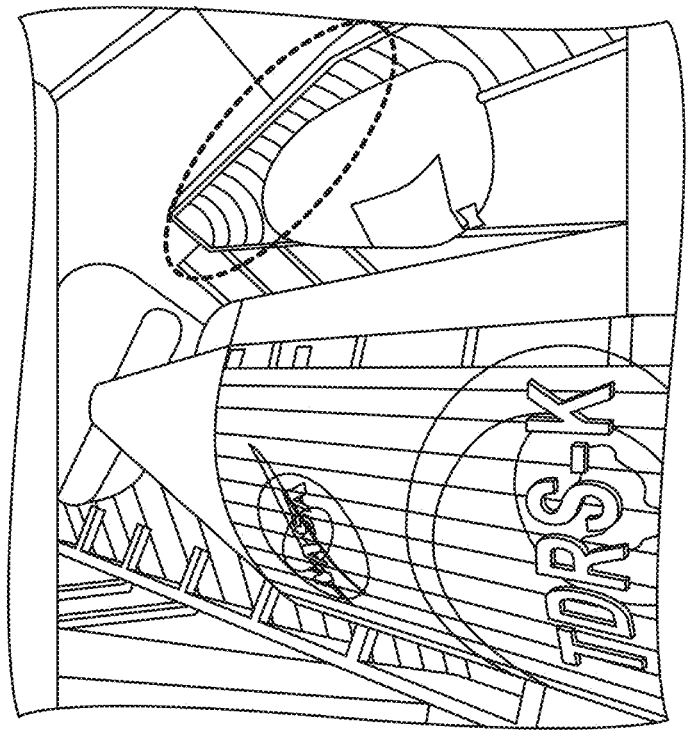

Examples of uses for inclusions according to principles of the present invention are illustrated in FIGS. 17-19, and include vehicle panels, seats and in space launch vehicles. These examples are by no means intended to be limiting.

For example, FIG. 17 illustrates elongated tubular inclusions 170 according to principles of the present invention incorporated into vehicular structural panels. As can be appreciated from the figures, the tubular inclusions 170 include voids. The near buckling constraint on the tubular inclusions may be provided by an external cylindrical shell or the near buckling constraint may be imparted by load provided by components, such as walls 174, of the structural panel itself.

As illustrated in at least FIG. 18, hyperdamping material including appropriate voids to impart the beam-like properties according to principles of the present invention may be included in a structural design, where the near buckling condition is provided by external load-providing structures, such as spacing panels or walls at the boundary of the hyperdamping material 184.

As illustrated in at least FIG. 19, hyperdamping inclusions including appropriate voids to impart the beam-like properties according to principles of the present invention may be included in a structural design for other vibration environments, such as space launch vehicles. As can be appreciated from the figures, the inclusions 190 include voids. The near buckling constraint on the tubular inclusions may be provided by an external shell or the near buckling constraint may be imparted by load provided by components, such as walls, of the structural panel itself.

As employed here, "hyperdamping" indicates an unusually large proportion of damping forces, with respect to inertial and stiffness-based forces, in consequence to design- or constraint-based factors imposed upon an intelligently architected inclusion topology. In the present implementation, the selection of diametric ratio for a given elastomer element topology enables the extreme softening which is characteristic of loading conditions at the elastic stability limit. Other researchers have realized similar anomalous dissipative phenomena via applied compressive stress, ferroelectric domain switching, and temperature control. Contrasting these approaches, the strategy employed here to realize hyperdamping within the poroelastic media is passive, non-destructive to the host material, and not subject to major deviation over time by hysteretic influences, thus making the proposed hyperdamping metamaterials more viable for practical applications. Moreover, this study focuses on the impact of an individual inclusion upon the resulting vibroacoustic properties of the metamaterial. This contrasts with previous studies that have exemplified the roles of periodicity towards magnifying the energy absorption possible in resonant metamaterials or phononic crystals. Yet, based on the experimental evidence described herein, substantial broadband energy trapping and attenuation is achievable even when employing just one hyperdamping inclusion at a 2% volume fill in the poroelastic media.

Principles of the present invention provide hyperdamping metamaterials to realize broadband energy trapping and attenuation, while retaining the advantages of a lightweight solution viable for diverse noise and vibration control applications. Because the hyperdamping effects are not reliant upon the resonance- or bandgap-based phenomena of conventional metamaterials and phononic crystals, the effectiveness of the energy attenuation is more robust for working conditions where the peak frequencies of vibroacoustic energy may vary in time. In this way, the lightweight, hyperdamping metamaterials have practical benefits over contemporary counterparts.

Embodiments of the present invention provide lightweight, hyperdamping metamaterials that interface with the acoustic free field to achieve large vibration and acoustic wave energy attenuation.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. An apparatus, comprising:
an interior portion;
an exterior boundary portion; and
a plurality of structural members separated by at least two voids, the plurality of structural members positioned between the interior portion and the exterior boundary portion, the plurality of structural members subject to a load from at least one of the interior portion or the exterior boundary portion,
the apparatus being configured to attenuate at least one of shock or vibration.

2. The apparatus of claim 1, wherein the load is a compressive load.

3. The apparatus of claim 2, wherein each structural member from the plurality of structural members is compressed between the interior portion and the exterior boundary portion by an equal force.

4. The apparatus of claim 1, wherein each structural member from the plurality of structural members is compressed to an elastic stability limit of the structural member.

5. The apparatus of claim 1, wherein the plurality of structural members is composed of at least one of natural rubber, synthetic rubber, butyl rubber, silicone rubber, butadiene rubber, neoprene, fluoroelastomer, thermoplastics, elastin, resilin, polysulfide, thermoset, or polyurethane.

6. The apparatus of claim 1, wherein the interior portion has a density greater than a density of the plurality of structural members.

7. The apparatus of claim 1, wherein the apparatus is configured to attenuate vibrations having a frequency between 175 Hz and 225 Hz.

8. An apparatus, comprising:
an interior portion;
a plurality of structural members separated by at least two voids, the plurality of structural members extending from the interior portion; and
a boundary portion, the boundary portion imparting a compressive load on the plurality of structural members such that the plurality of structural members has a collective volume smaller than a collective volume of the plurality of structural members in an uncompressed state.

9. The apparatus of claim 8, wherein the apparatus is configured to attenuate at least one of shock or vibration.

10. The apparatus of claim 8, wherein the interior portion is composed of at least one of a metal, a ceramic, or a plastic.

11. The apparatus of claim 8, wherein each structural member from the plurality of structural members is compressed by an equal compressive force.

12. The apparatus of claim 8, wherein the apparatus is configured to attenuate vibrations having a frequency between 175 Hz and 225 Hz.

13. The apparatus of claim 8, wherein the apparatus has a cylindrical structure.

14. An apparatus, comprising:
an elastic element including an inner portion and a plurality of structural members extending outward from the inner portion,
the elastic element disposed within a boundary such that each structural member from the plurality of structural members is compressed between the inner portion and the boundary,
the elastic element configured to attenuate waves including at least one of shock or vibration.

15. The apparatus of claim 14, wherein the elastic element is configured to attenuate the waves at frequencies of about 175 Hz to about 225 Hz.

16. The apparatus of claim 14, wherein each structural member from the plurality of structural members is compressed between the inner portion and the boundary by an equal force.

17. The apparatus of claim 14, wherein each structural member from the plurality of structural members is compressed to an elastic stability limit of that structural member.

18. The apparatus of claim 14, wherein the elastomer element further includes an outer perimeter, each structural member from the plurality of structural members extending radially outward from the inner portion to the outer perimeter.

19. The apparatus of claim 14, wherein the inner portion includes a mass with a density greater than that of the plurality of structural members.

20. The apparatus of claim 14, wherein the inner portion includes at least one of an elastic mass or a metallic mass.

21. The apparatus of claim 14, wherein the elastic element disposed within the boundary has a lower fundamental eigenfrequency than the elastic element in an uncompressed state.

\* \* \* \* \*